United States Patent
Yarlagadda et al.

(10) Patent No.: US 12,236,662 B2
(45) Date of Patent: Feb. 25, 2025

(54) POINT OF SALE STATION FOR ASSISTED CHECKOUT SYSTEM

(71) Applicant: RadiusAI, Inc., Tempe, AZ (US)

(72) Inventors: Abhinav Yarlagadda, Woodinville, WA (US); Aykut Dengi, Tempe, AZ (US); Sai Krishna Bashetty, Bellevue, WA (US); Rahul Santhosh Kumar Varma, Tempe, AZ (US); Daniel King, Seattle, WA (US); Kamalesh Kalirathinam, Tempe, AZ (US); Nathan Kelly, Phoenix, AZ (US); Sri Priyanka Madduluri, Arlington, VA (US); Thomas Strich, Tempe, AZ (US)

(73) Assignee: RadiusAI, Inc., Tempe, AZ (US)

( * ) Notice: Subject to any disclaimer, the term of this patent is extended or adjusted under 35 U.S.C. 154(b) by 0 days.

(21) Appl. No.: 18/414,284

(22) Filed: Jan. 16, 2024

(65) Prior Publication Data

US 2024/0242578 A1  Jul. 18, 2024

Related U.S. Application Data

(60) Provisional application No. 63/587,874, filed on Oct. 4, 2023, provisional application No. 63/439,149, filed
(Continued)

(51) Int. Cl.
*G06Q 20/20* (2012.01)
*G06V 10/12* (2022.01)
(Continued)

(52) U.S. Cl.
CPC ......... *G06V 10/48* (2022.01); *G06Q 20/208* (2013.01); *G06V 10/12* (2022.01); *G06V 10/40* (2022.01);
(Continued)

(58) Field of Classification Search
CPC ......... G07G 1/12; G07G 1/0018; G06V 10/70
See application file for complete search history.

(56) References Cited

U.S. PATENT DOCUMENTS 11,113,680 B2 * 9/2021 Song ............... G06K 7/1443
11,157,917 B2 * 10/2021 Patil ............... G06N 20/00
(Continued)

FOREIGN PATENT DOCUMENTS

| BR | 102021006685 A2 * | 10/2022 |
| EP | 3514772 A1 * | 7/2019 |
| WO | 2021119601 A1 | 6/2021 |

OTHER PUBLICATIONS

C. Puspitasari, G. Pangestu, A. Rahayu and B. I. Al-Abdillah, "AR-Mart: The Implementation of Augmented Reality as a Smart Self-Service Cashier in the Pandemic Era," 2021 1st International Conference on Computer Science and Artificial Intelligence (ICCSAI), Jakarta, Indonesia, 2021, pp. 413-417 (Year: 2021).*
(Continued)

*Primary Examiner* — Ashford S Hayles
(74) *Attorney, Agent, or Firm* — Taft Stettinius & Hollister LLP

(57) ABSTRACT

Assisted checkout devices, including point-of-sale stations, can use computer vision and machine learning to speed the checkout process while maintaining human verification, assistance, and customer interaction provided by human clerks. A plurality of optical sensors, including cameras, can be arranged with different views of a checkout plane upon which items being purchased by a buyer are placed. Moreover, one or more support towers can be utilized to elevate the optical sensors to vertical heights at which the checkout plane, and items placed thereon, is within the field of view of the optical sensors. The information captured by the plurality of optical sensors can be analyzed using machine
(Continued)

learning models to detect and identify the items placed on the checkout plane.

20 Claims, 22 Drawing Sheets

Related U.S. Application Data on Jan. 15, 2023, provisional application No. 63/439,113, filed on Jan. 14, 2023.

(51) Int. Cl.
| | | |
|---|---|---|
| G06V 10/40 | (2022.01) | |
| G06V 10/48 | (2022.01) | |
| G06V 10/70 | (2022.01) | |
| G06V 10/82 | (2022.01) | |
| G06V 10/94 | (2022.01) | |
| G06V 20/40 | (2022.01) | |
| G06V 20/52 | (2022.01) | |
| G06V 40/10 | (2022.01) | |
| G07G 1/00 | (2006.01) | |
| G07G 1/12 | (2006.01) | |

(52) U.S. Cl.
CPC .............. *G06V 10/70* (2022.01); *G06V 10/82* (2022.01); *G06V 10/95* (2022.01); *G06V 20/41* (2022.01); *G06V 20/52* (2022.01); *G06V 40/10* (2022.01); *G07G 1/0009* (2013.01); *G07G 1/0018* (2013.01); *G07G 1/12* (2013.01); *G06V 2201/10* (2022.01)

(56) References Cited

U.S. PATENT DOCUMENTS

| | | | | |
|---|---|---|---|---|
| 11,170,186 | B2* | 11/2021 | Lee | G06Q 20/18 |
| 11,462,083 | B2* | 10/2022 | Birnie | A47F 9/047 |
| 11,481,751 | B1* | 10/2022 | Chaubard | G06V 10/82 |
| 11,562,338 | B2* | 1/2023 | Eger | G06V 20/52 |
| 11,756,017 | B1* | 9/2023 | Catoe | G07G 1/0036 235/383 |
| 2004/0120581 | A1 | 6/2004 | Ozer et al. | |
| 2006/0010028 | A1 | 1/2006 | Sorensen | |
| 2006/0261157 | A1* | 11/2006 | Ostrowski | G07G 1/0054 235/383 |
| 2013/0306727 | A1* | 11/2013 | Shearin | G06K 7/10 235/440 |
| 2016/0109281 | A1 | 4/2016 | Herring et al. | |
| 2017/0068945 | A1 | 3/2017 | Tsuchimochi et al. | |
| 2017/0323704 | A1 | 11/2017 | Ovalle | |
| 2017/0364751 | A9 | 12/2017 | Saitwal et al. | |
| 2018/0189763 | A1* | 7/2018 | Olmstead | G06V 10/42 |
| 2018/0314863 | A1* | 11/2018 | Gao | G06K 7/1456 |
| 2019/0005343 | A1* | 1/2019 | Srivastava | G06V 10/809 |
| 2019/0034897 | A1 | 1/2019 | Gao et al. | |
| 2019/0108396 | A1* | 4/2019 | Dal Mutto | G06V 20/52 |
| 2019/0172041 | A1* | 6/2019 | Hill | G06Q 20/202 |
| 2020/0302161 | A1 | 9/2020 | Sriram et al. | |
| 2021/0065217 | A1 | 3/2021 | Glaser et al. | |
| 2021/0117948 | A1* | 4/2021 | Voss | G06Q 20/322 |
| 2021/0174431 | A1* | 6/2021 | Dhankhar | G01G 19/40 |
| 2021/0304421 | A1 | 9/2021 | Othman et al. | |
| 2021/0343136 | A1 | 11/2021 | Souloglou | |
| 2021/0350496 | A1* | 11/2021 | Carey | G06T 1/0014 |
| 2021/0401192 | A1* | 12/2021 | Yang | G06V 10/40 |
| 2021/0406737 | A1 | 12/2021 | Zingaretti et al. | |
| 2022/0165074 | A1* | 5/2022 | Srivastava | G06T 17/10 |
| 2022/0207969 | A1 | 6/2022 | Howard et al. | |
| 2022/0343308 | A1* | 10/2022 | Yang | G07G 1/0054 |
| 2022/0343660 | A1* | 10/2022 | Yang | G06V 10/82 |
| 2022/0383384 | A1 | 12/2022 | Bronicki | |
| 2022/0405321 | A1 | 12/2022 | Morate et al. | |
| 2022/0414924 | A1* | 12/2022 | Krishnamurthy | G06N 20/00 |
| 2023/0026014 | A1 | 1/2023 | Brandt et al. | |
| 2023/0230060 | A1* | 7/2023 | Mistkawi | G06Q 20/208 705/23 |
| 2024/0070637 | A1* | 2/2024 | Slaughter | G06Q 20/3278 |

OTHER PUBLICATIONS

International Search Report; International Searching Authority; International Application No. PCT/US2024/011638; Mar. 25, 2024; 3 pages.

Written Opinion of the International Searching Authority; International Searching Authority; International Application No. PCT/US2024/011638; Mar. 25, 2024; 18 pages.

Shidik et al. "A systematic review of intelligence video surveillance: Trends, techniques, frameworks, and datasets." IEEE Access 7 (2019): 170457-170473. Retrieved on Mar. 18, 2024 (Mar. 18, 2024) from <https://ieeexplore.ieee.org/stamp/stamp.jsp?arnumber=8911368>.

International Search Report; International Searching Authority; International Application No. PCT/US2024/011690; Apr. 17, 2024; 2 pages.

Written Opinion of the International Searching Authority; International Searching Authority; International Application No. PCT/US2024/011690; Apr. 17, 2024; 8 pages.

International Search Report and Written Opinion, PCT/US2024/049964, RadiusAI, Inc., Dec. 26, 2024, 8 pgs.

* cited by examiner

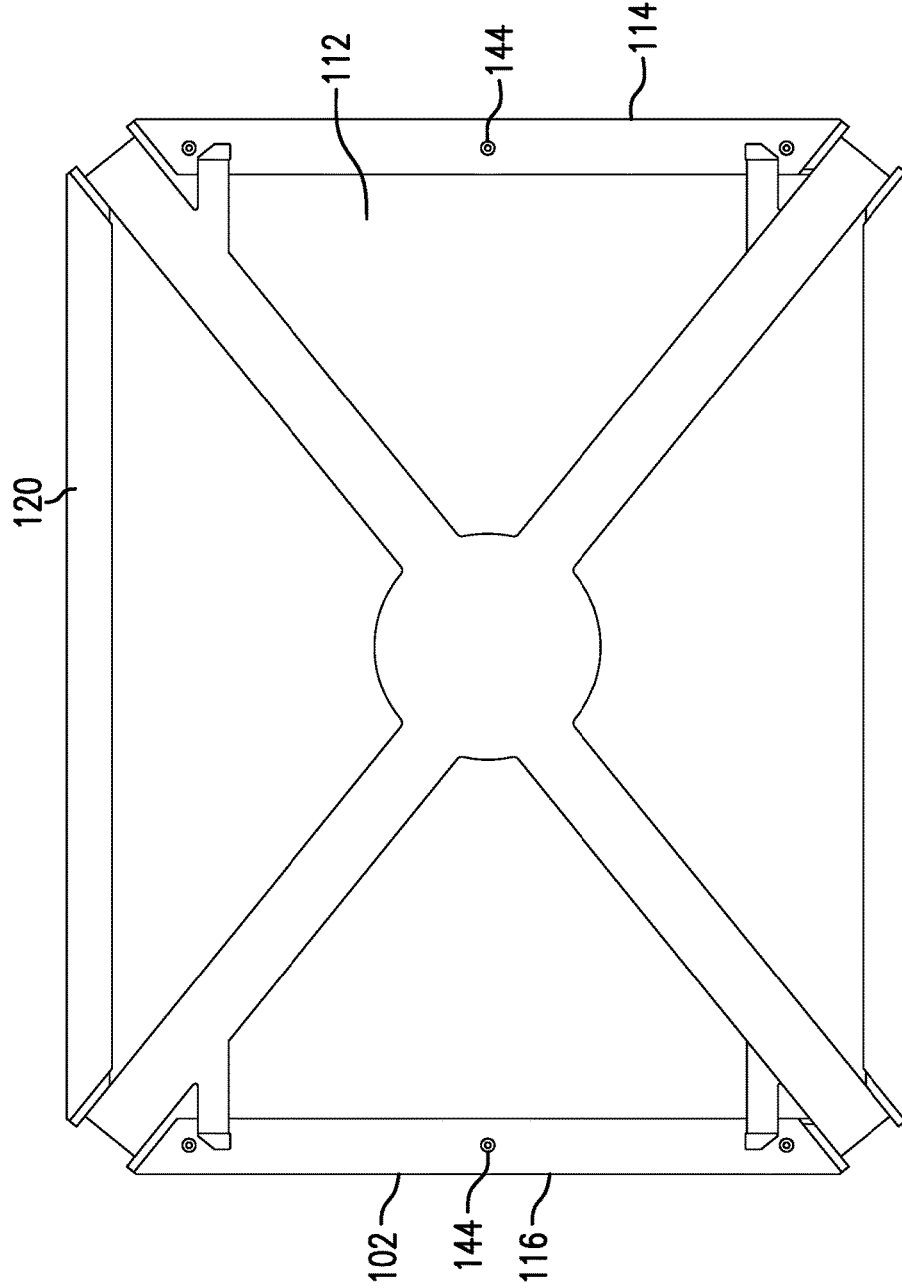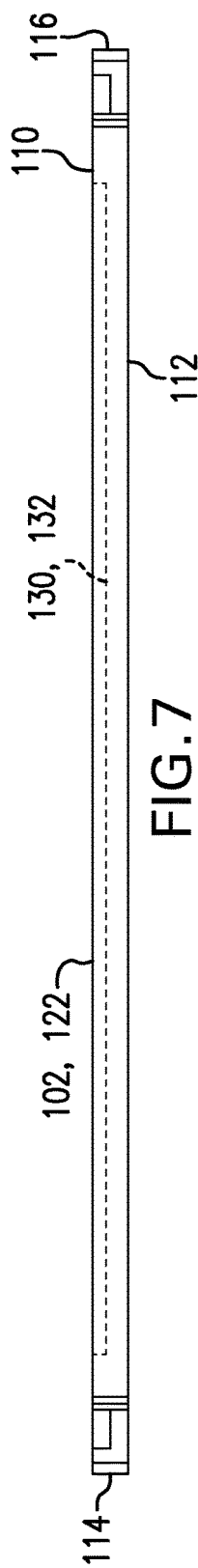
FIG. 6
FIG. 7

POINT OF SALE STATION FOR ASSISTED CHECKOUT SYSTEM

CROSS-REFERENCE TO RELATED APPLICATIONS

The present application is a U.S. non-provisional application that claims the benefit of U.S. provisional application No. 63/439,113, filed on Jan. 14, 2023, U.S. provisional application No. 63/439,149, filed on Jan. 15, 2023, and U.S. provisional application No. 63/587,874, filed on Oct. 4, 2023, each of which is incorporated herein by reference in their entirety.

TECHNICAL FIELD

The present disclosure generally relates to assisted checkout systems, and more particularly, but not exclusively, to point-of-sale stations.

BACKGROUND

Traditional on-premises retail sales of goods and services from a retailer or seller to a buyer or customer often involve use of a cash register. Moreover, in connection with a checkout process during which the buyer typically tenders payment for the goods or services being purchased, a laser or scanner of the cash register can be utilized by either a human employee of the retailer, also known as a cashier, or by the buyer to scan a printed coded marking on, or for, the item(s) or service(s) being purchased. Such coded markings can include, for example, a Uniform Product Code (UPC) barcodes or Quick Response (QR) code. With such systems, for the items being purchased, the buyer can tender the associated payment via cash payment or cashless payment, including, for example, by credit card, debit card, or electronic payment.

SUMMARY

The present disclosure may comprise one or more of the following features and combinations thereof.

In one embodiment of the present disclosure, a point-of-sale station is provided for use in selling one or more items. The point-of-sale station can include a plurality of optical sensors and a plurality of support towers. Each support tower of the plurality of support towers can be coupled to at least one optical sensor of the plurality of optical sensors and configured to position the at least one optical sensor at a vertical height that is higher than a checkout plane on which the one or more items are to be placed when being purchased. The point-of-sale station can also include a first computing device that can have a first artificial intelligence (AI) acceleration unit. The first computing device can be configured to store one or more trained machine learning (ML) models, and be configured to extract still image frames from information captured by each of the plurality of optical sensors and to process the still image frames using the one or more trained ML models to recognize the one or more items on the checkout plane.

In another embodiment, a point-of-sale station is provided for use in selling one or more items. The point-of-sale station can include a base portion that can define at least a portion of a checkout plane, the checkout plane being configured for placement of the one or more items. The point-of-sale station can also include a plurality of support towers coupled to the base portion, the plurality of support towers at least upwardly vertically extending relative to an upper surface of the base portion. Additionally, the point-of-sale station can include a plurality of cameras, at least one camera of the plurality of cameras can be coupled to each support tower of the plurality of support towers at a location at which a focal point of one or more of the plurality of cameras can be vertically aligned and offset from a geometric center of the checkout plane. The point-of-sale station can also include a first computing device that can have a first artificial intelligence (AI) acceleration unit. The first computing device can be configured to store one or more trained machine learning (ML) models, and can be configured to extract still image frames from information captured by each of the plurality of cameras and to process the still image frames using the one or more trained ML models to recognize the one or more items on the checkout plane.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIGS. 5, 6, and 7 illustrate top, bottom, and side views, respectively, of the base portion shown in FIG. 4.

DETAILED DESCRIPTION OF THE ILLUSTRATIVE EMBODIMENTS

Figure 1:
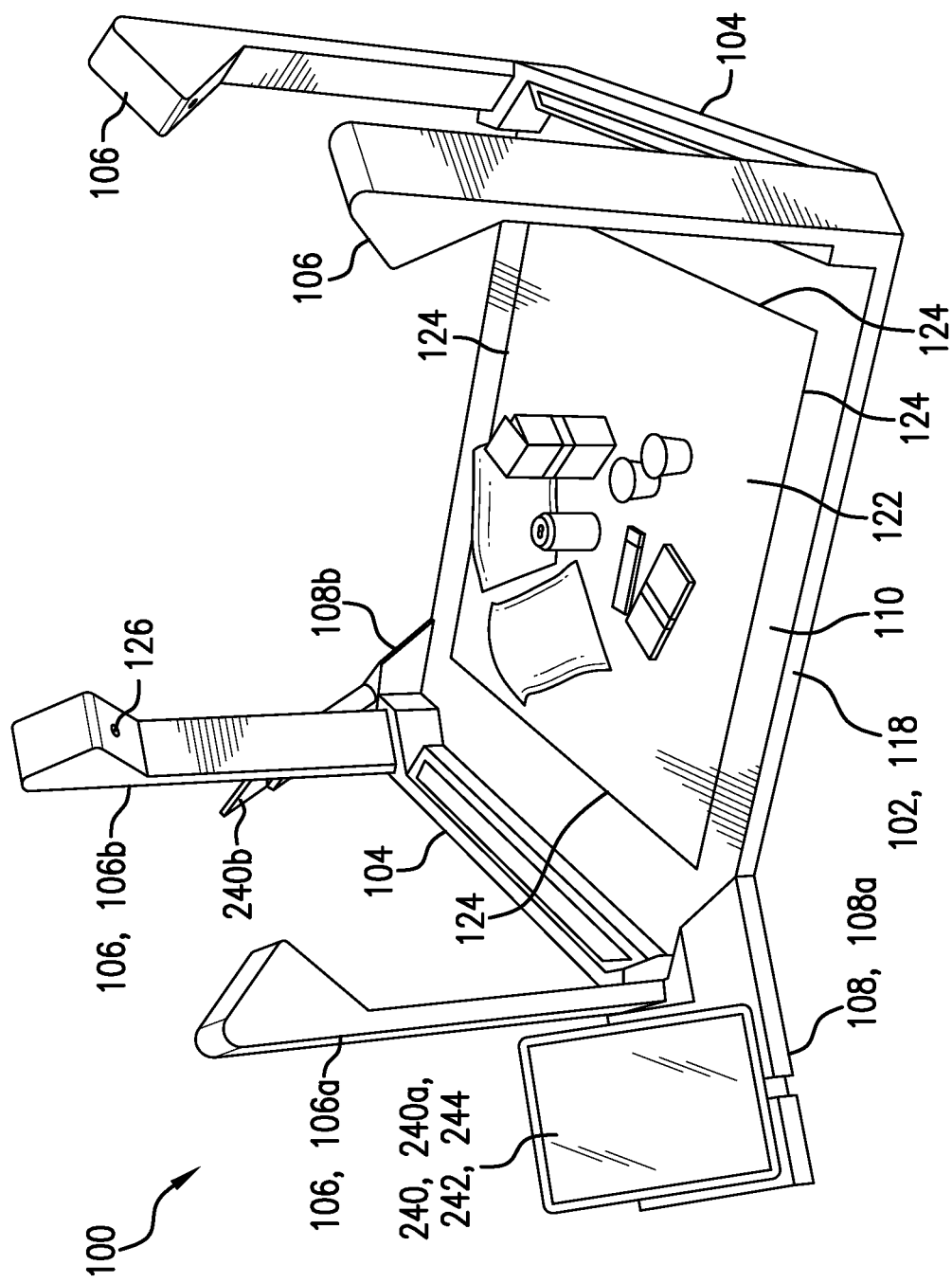
FIG. 1 illustrates a front side perspective view of an exemplary point-of-sale station for an assisted checkout system.

Embodiments of the disclosure generally relate to a point-of-sale (POS) station having a plurality of optical sensors that are fixedly mounted, or, alternatively, are adjustable such that each optical sensor has an elevated view of at least a portion of a checkout counter or area. Moreover, each optical sensor can be oriented relative to at least a checkout plane of, or on, a base portion of the POS station such that items placed within the checkout plane are within at least a portion of a field of view of each of the one or more optical sensors. The POS station can further include one or more support towers to which at least some of the one or more of the optical sensors are secured. According to certain embodiments in which the optical sensors are cameras, the support towers can be configured to accommodate the focal points of the cameras being vertically aligned and offset from a geometric center of the checkout plane. One or more additional optical sensors can be positioned above the checkout plane so as to provide an overhead or top-down view of at least the checkout plane, and/or positioned beneath the checkout plane. The POS station can further include one or more illumination devices that can be configured to provide a visual cue indicative of at least a checkout status at least while items are being identified and/or purchased via use of the POS station. The visual cue can be provided in a variety of different manners, including via use of a plurality of illumination patterns and/or colors, as well as via audible alerts.

The POS station can further include, or be communicatively coupled to, a first computing device that is communicatively coupled to the plurality of optical sensors. The first computing device can include a first central processing unit (CPU), memory, and a first artificial intelligence (AI) acceleration unit, e.g., a graphics processing unit (GPU) or tensor processing unit (TPU). Further, the first computing device can be configured to store one or more trained machine learning (ML) models. The first computing device is configured to extract still image frames from video streams from the optical sensors, among other forms of captured information, and to process the still image frames using the one or more trained ML models to recognize one or more items positioned on the checkout plane.

The POS station can further include a video display monitor configured to display a graphical user interface (GUI) including a checkout list, the checkout list initially including the one or more recognized items received from the first computing device. The system can include two display monitors, e.g., one facing a customer and one facing a cashier. The first computing device, or a second computing device including a second AI acceleration unit and communicatively coupled to the first computing device, is configured to receive an identifier of an item and to retrain at least one of the one or more trained ML models based on the identifier and the still image frames to produce at least one retrained ML model. According to certain embodiments, the system can further include an input device, such as a UPC barcode scanner or a keypad, configured to input the identifier of the item or to determine the identifier of the item by scanning an identifying mark on the item.

As used herein, the term "checkout" is used to refer both to the checkout process, during which items intended to be purchased are identified, and prices tallied, by an assigned retail clerk ("cashier"), and also to the area within a retail location ("store") at which the checkout process occurs. Checkout is known to present the greatest temporal and spatial bottleneck to profitable retail activity. Time spent waiting for checkout to commence (e.g., in a checkout line) and completing checkout (e.g., while a cashier scans items individually) reduces the turnover of customers completing journeys within the store, impedes flow of customer traffic within the store, and serves as a point of customer dissatisfaction in the shopping experience, as well as posing a draining and repetitive task for cashiers. On the other hand, customers appreciate and expect human interaction during checkout, and self-service checkout systems are themselves a point of aggravation in the customer experience. Accordingly, the devices, systems, and methods described herein advantageously employ computer vision and machine learning techniques to reduce the friction associated with the checkout experience while maintaining the possibility of human oversight of the checkout process and the opportunities for human interaction between customers and cashiers.

The devices, systems, and methods described herein provide a defined checkout plane upon which items are placed for recognition by computing systems that can automatically list items presented at checkout for purchase and tally their prices, eliminating or greatly reducing the human labor associated with scanning items one-by-one. The devices, systems, and methods described herein are capable of using artificial intelligence to recognize many items placed on the checkout plane at once, even when such items may be bunched together to occlude views of portions of some of the items, and of continually improving their recognition accuracy through machine learning.

Figure 2:
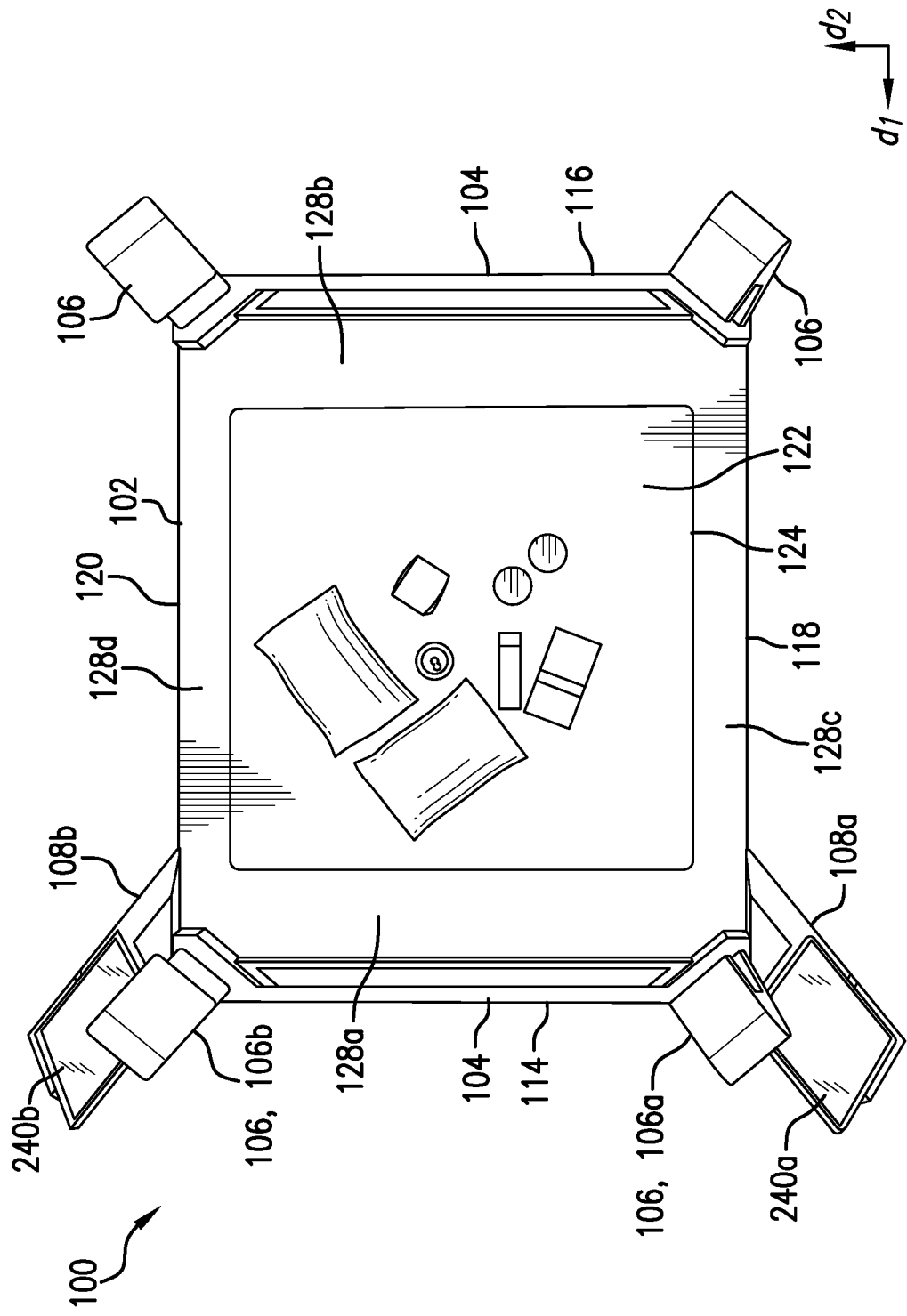
FIG. 2 illustrates a top view of the point-of-sale station shown in FIG. 1.
Figure 3:
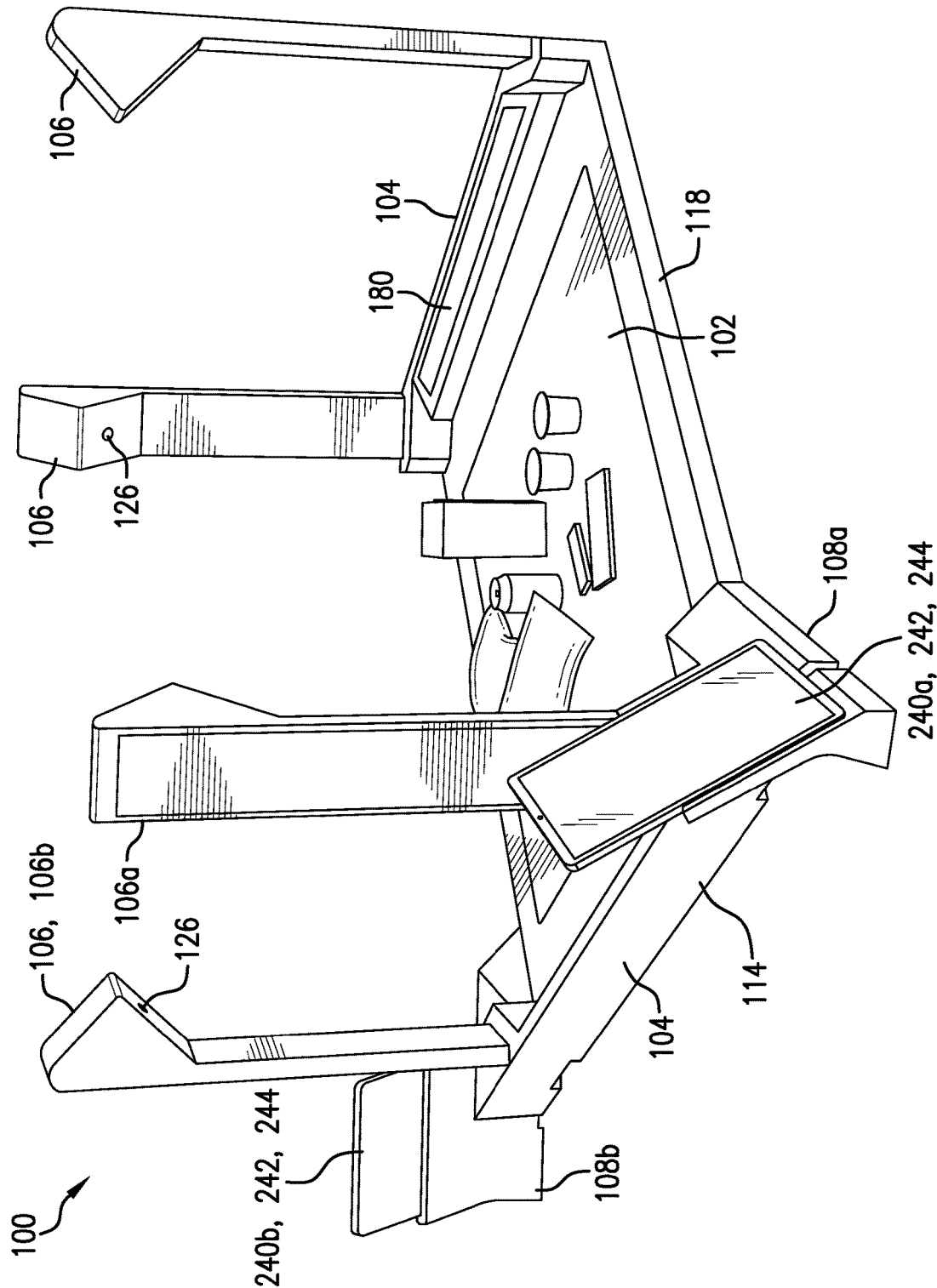
FIG. 3 illustrates a rear side perspective view of the point-of-sale station shown in FIG. 1.
Figure 4:
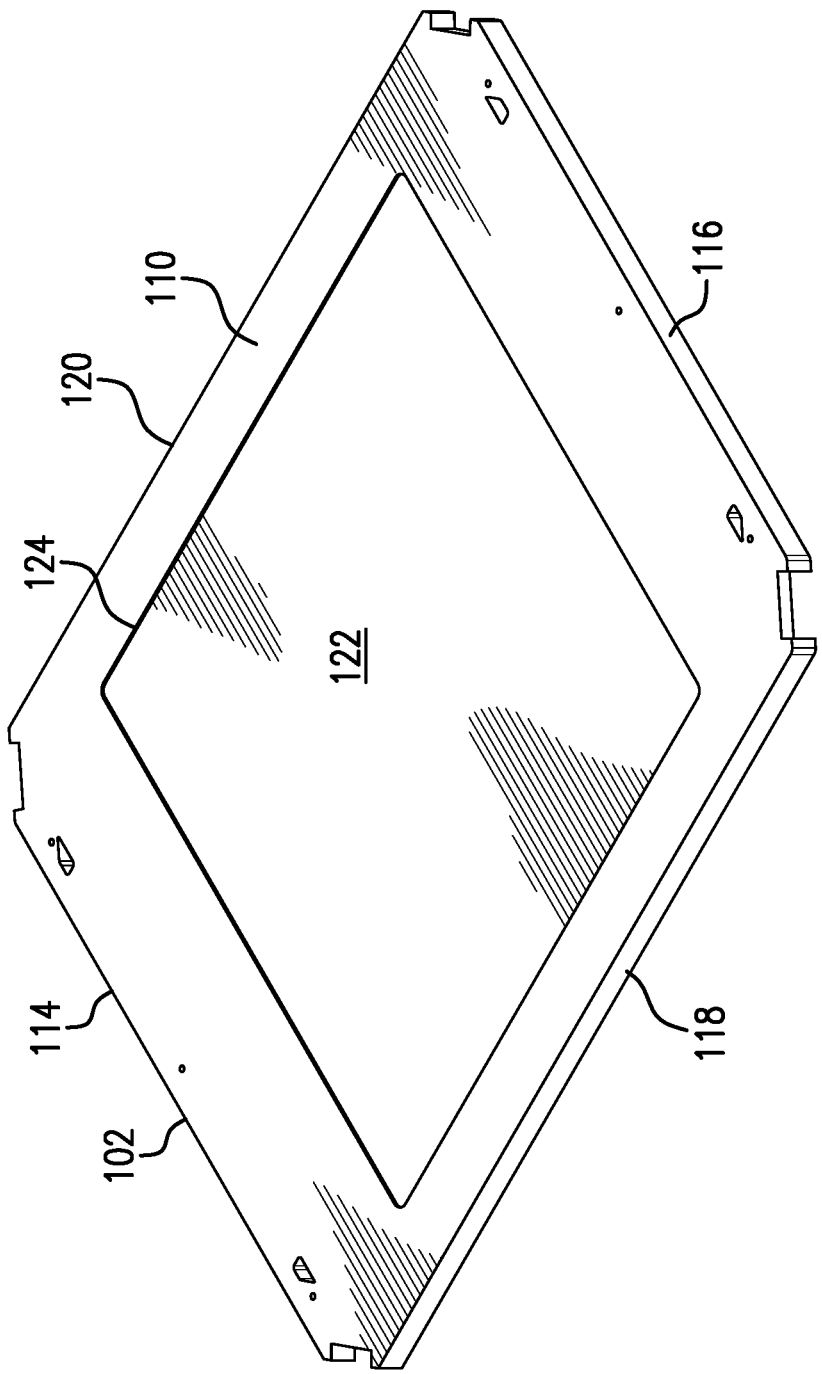
FIG. 4 illustrates a top side perspective view of an exemplary base portion of the point-of-sale station shown in FIG. 1.

FIGS. 1-3 illustrate an exemplary point-of-sale (POS) station 100 for an assisted checkout system. As illustrated, the POS station 100 can include, for example, a base portion 102, one or more side supports 104, and a plurality of support towers 106. Additionally, or alternatively, the POS station 100 can further include a tablet or user interface stand 108. At least certain components of the POS station 100 can be fabricated using molding or subtractive or additive manufacturing. Further, various components of the POS station 100 can be configured to be packaged together and shipped and assembled at a store, including a retailer premises, with a simple snap-together or screw-together assembly, and, moreover, without special training or instructions.

Figure 5:
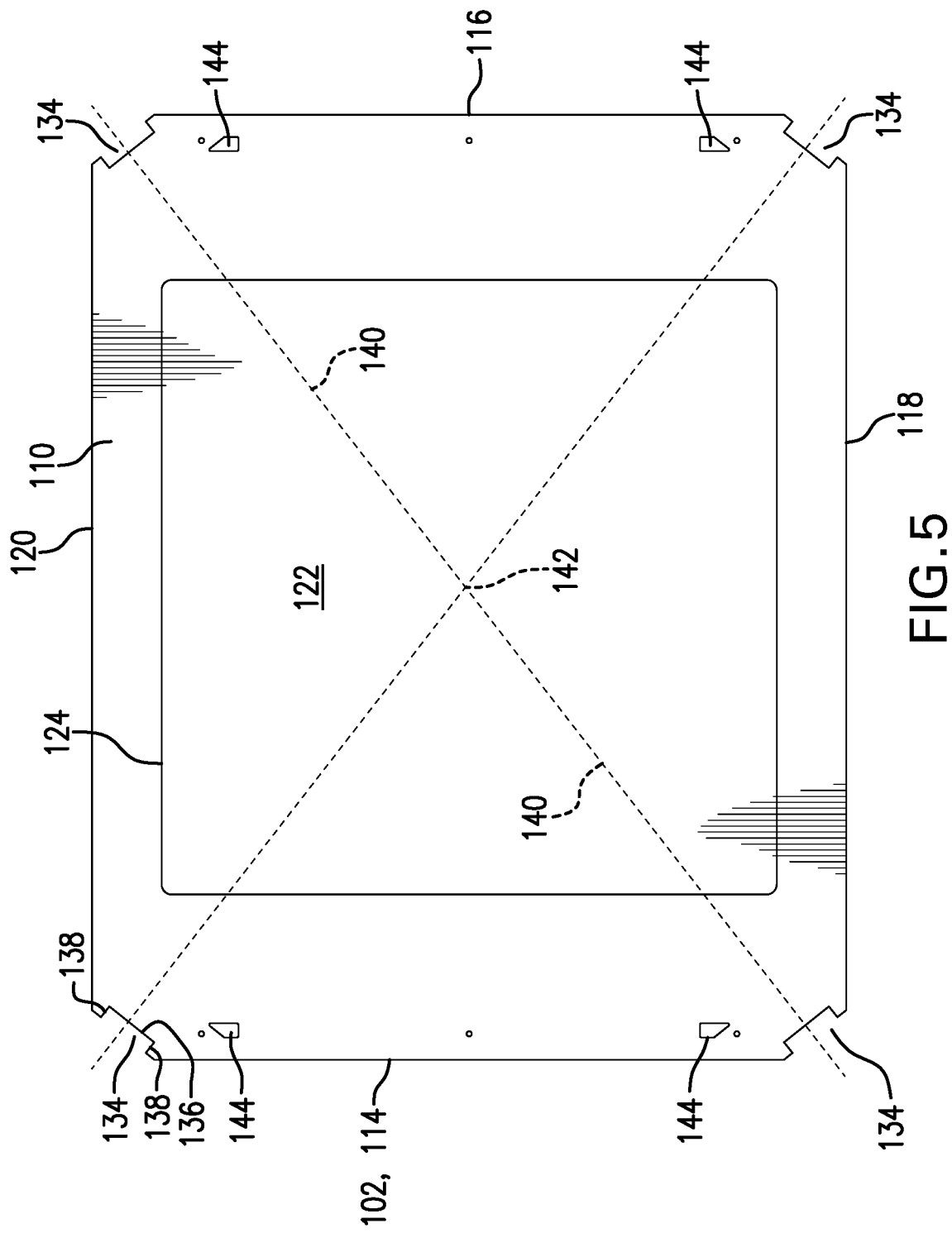

As seen in at least FIGS. 1, 2, and 4-7, the base portion 102 can include opposing upper and bottom surfaces 110, 112, and can extend in a first direction (as generally indicated by "$d_1$" in FIG. 2) between opposing first and second sides 114, 116, and in another, or second, direction (as generally indicated by "$d_1$" in FIG. 2) between opposing front and rear sides 118, 120. Thus, the first and second sides 114, 116, as well as the front and rear sides 118, 120, can generally define an outer shape of at least a portion of the base portion 102, as seen in at least FIGS. 5 and 6. For example, as seen in FIGS. 5 and 6, according to certain embodiments, the base portion 102 can have a generally square or rectangular shape. According to certain embodiments, the base portion 110 can have a first size, such as a length, in the first direction ("$d_1$") between the first and second sides 114, 116 that is between about 24 inches and about 44 inches, and, more particularly, is about 32 inches. Additionally, according to certain embodiments, the base portion 110 has a second size, such as a length, in the second direction ("$d_2$") between opposing front and rear sides 118, 120 that is between about 12 inches and about 30 inches, and more particularly, about 24 inches. Accordingly, in some examples, the second dimension ("$d_2$") can be shorter than the first dimension ("$d_1$"), or vice versa. Further, according to certain embodiments, the base portion 110 can have a generally rectangular configuration that is approximately, about 24 inches by about 32 inches, or, alternatively, is about 24 inches by about 44 inches. However, the base portion 102 can have a variety of other round or non-round shapes, as well as a combinations thereof. Further, the base portion 102 can be constructed from a variety of materials, including, but not limited to, plastics, among other materials.

According to certain embodiments, at least a portion of the upper surface 110 of the base portion 102 can generally define a checkout plane 122. Moreover, the POS station 100 can, for example, include one or more visually detectable features, including structural and/or non-structural features, as well as combinations thereof, that that can generally define, including used to visually identify, a boundary 124 (FIG. 5) of the checkout plane 122. Such a boundary 124 can be visually identifiable via one or more walls that can be positioned within, or outside of, the boundary 124, lights that can increase a level of illumination within the boundary 124 relative to areas outside of, and adjacent to, the boundary 124, contrasts in surface textures, materials, and/or color within and outside of the boundary 124, differences in the elevation of the surface within the boundary 124 relative to the adjacent area outside of the boundary 124, and/or markings, as well as combinations thereof, among other structure and/or ornamental features. Thus, such a boundary 124 can assist in defining an area that can serve as a visual indicator, including to a customer and/or cashier, among others, of the location at which items being purchased via use of at least the POS station 100 are to be placed. Similarly, the boundary 124 can provide a self-enforcing structural feature that necessitates items for checkout to be placed within the confines of the boundary 124.

The boundary 124 can be configured to comprise at least a portion of an area that is within a field of view of the one or more optical sensors of an optical system of the POS station 100. Moreover, the boundary 124 can correspond to one or more areas in which one more optical sensors 126 of the POS station 100 can capture information, including, but not limited to, one or more images, photographs, and/or video, as well as combinations thereof, among other information, that includes at least representations of the items that are placed in the checkout plane 122, and, moreover, within the confines of the associated boundary 124. Thus, the checkout plane 122, as defined by the boundary 124, can have a variety of configurations, including shapes and sizes. For example, the boundary 124 can be configured to define a checkout plane 122 that has a square, rectangular, circular, oval, or of any other two-dimensional shape.

In the illustrated example, the checkout plane 122 is generally square or rectangular. In examples having a square or rectangular checkout plane 122, the checkout plane 122 has a first dimension in the first direction ("$d_1$") and a second dimension in the second direction ("$d_2$"). According to certain embodiments, the first dimension can, for example, be between about 24 inches and about 36 inches. According to certain embodiments, the second dimension can be, for example, between about 12 inches and about 30 inches. Further, according to certain embodiments, with respect to the checkout plane 122, the second dimension can be shorter than the first dimension. Thus, in one non-limiting example, the checkout plane 122 has a generally square shape in which the first and second dimensions are both about 24 inches. According to another example, one of the first and second dimensions is about 24 inches, and the other of the first and second dimensions is about 36 inches.

According to certain embodiments, the base portion 110 of the POS station 100 can, for example, have dimensions equal to, or greater than, the checkout plane 122 in the first and second directions ("$d_1$", "$d_2$"), respectively. Thus, according to certain embodiments, the boundary 124 of the checkout plane 122 can, relative to the upper surface 110 of the base portion 102, extend along, or, alternatively, be inwardly offset from, one or both of the first and second sides 114, 116 and/or one or both of the front and rear sides 118, 120 of the base portion 102. Thus, for example, at least FIG. 5 illustrates an exemplary embodiment in which the boundary 124 is inwardly offset from the both the first and second sides 114, 116 and the front and rear sides 118, 120 of the base portion 102. In such an example, the checkout plane 122 can be separated from: the first side 114 of the base portion 102 or an adjacent side support 104 by a first border wall 128a; the second side 116 of the base portion 102 or an adjacent side support 104 by a second border wall 128b; the front side 118 of the base portion 102 by a front border wall 128c; and, the rear side 120 of the base portion 102 by a rear border wall 128d. As seen in FIG. 5, one or more of the border walls 128a-d can have a width, such as, for example, between the corresponding side 114, 116, 118, 120 of the base portion 102 and/or adjacent side support 104 and the inwardly offset portion of the adjacent boundary 124 that is different than a corresponding width of at least one other border wall 128a-d. For example, the width of the first border wall 128a can generally be the same, or similar to, the corresponding width of the second border wall 128b, but different than the width of the front and rear border walls 128c, 128d.

According to certain embodiments, the checkout plane 122 can be provided by a substrate 130 that is positioned within a cavity 132 (FIG. 7) in the base portion 102. The cavity 132 can downwardly extend from the upper surface 110 of the base portion 102 in the direction of the bottom surface 110. The outer edges of the substrate 130 that can be seen when the substrate 130 is positioned in the cavity 132, or an outer perimeter of the cavity 132, can generally define the boundary 124 of the checkout plane 1222. Further, the substrate 130 can have a thickness such that, when positioned in the cavity 132, the substrate 130 is generally level or flush with adjacent portions of the upper surface 110 of the base portion 102. As discussed above with respect to the checkout plane 122, the substrate 130 can have one or more characteristics that can, at least optically, distinguish the substrate 130 from adjacent portions of at least the upper surface of the base portion 102. For example, relative to adjacent portions of the upper surface 110 of the base portion 102, the substrate 130 can have a visually detectable characteristic, such as, for example, a color or texture, that can at least assist an optical system of the POS station 100 in the identification, if not recognition, of items placed for purchase on the substrate 130. Additionally, or alternatively, the substrate 130 can be generally transparent. Such a transparent feature can accommodate one or more optical sensors that are positions beneath the substrate 130 to capture one or more images of items placed on the substrate 130. According to such an embodiment, at least a portion of the cavity 132 can provide a through hole that can accommodate placement of at least one optical sensor. Additionally, or alternatively, the substrate 130 can be part of a scale or weight sensor of the POS station 100 that can be used to weigh or measure, one or more items, or a collection of items, placed on the substrate 130. Such measurements can further assist in identifying products placed on the substrate 130 and/or assist in determining a cost of one or more items that may be sold as a function of the weight of the item(s) being purchased.

As seen in at least FIGS. 4-7, according to the illustrated embodiment, at or around the intersections of the first side 114 with the front side 118, the first side 114 with the rear side 120, the second side 116 with the front side 118, the second side 116 with the rear side 120 are inwardly directed lower recesses 134. Moreover, according to the illustrated embodiment of the base portion 102 shown in at least FIG. 5 in which the base portion 102 has a generally square or rectangular shape, a lower recess 134 can be positioned at one or more corners along the outer periphery of the base portion 102. According to the illustrated embodiments, the lower recess 134 can be generally defined by a lower base wall 136 that extends from and opposing pair of lower edge walls 138, the lower edge walls 138 extending from opposing ends of the lower base wall 136 to the outer periphery of the base portion 102.

According to certain embodiments, each lower recess 134 can be configured to matingly receive placement of at least a portion of a side support 104 and/or of a support tower 106. According to certain embodiments, the lower recess 134 can provide an area that can assist in the securing an adjacent side support 104 and/or of a support tower 106 to the base portion 102. Further, according to certain embodiments, the lower recess 134, including, for example, the corresponding base wall 136 and edge walls 138 can be angularly oriented in a manner that can assist with orienting a support tower 106, and the corresponding field of view for an optical sensor for that support tower 106 that will be positioned in, or around, the lower recess 134. Thus, for example, referencing FIG. 5, each lower recess 134 can, according to certain embodiments, have a central axis 140 that bisects the lower base wall 136, and wherein the central axes 140 of one or more, if not all, of the lower recesses 134 intersect each other at a central point 142 of the base portion 102 and/or of the checkout plane 122.

As also seen in at least FIG. 5, one or more of the border walls 128a-d can include orifices 144 that are configured to be utilized to secure a side support 104 to the base portion 102. According to certain embodiments, one or more of the orifices 144 can be sized to matingly receive placement of protrusion of a side support 104 in a manner that can provide a snap or interference fit between the protrusion and the orifice 144. Additionally, or alternatively, one or more of the orifices 144 are sized to receive passage of a mechanical fastener, such as, for example, a screw, bolt, and/or pin, among other fasteners, which can be used to secure the side support 104 to the base portion 102. As seen in at least FIG. 1, according to the illustrated embodiment, the POS station 100 includes two side supports 104 on or around opposing sides of the base portion 102, and, more specifically, adjacent to the first and second sides 114, 116 of the base portion 102. According to certain embodiments, in addition to being positioned along a portion of the first and second border walls 128a, 128b, a side support 104 can also extend over, or overlap, the associated first and second sides 114, 116 of the base portion 102.

Figure 8:
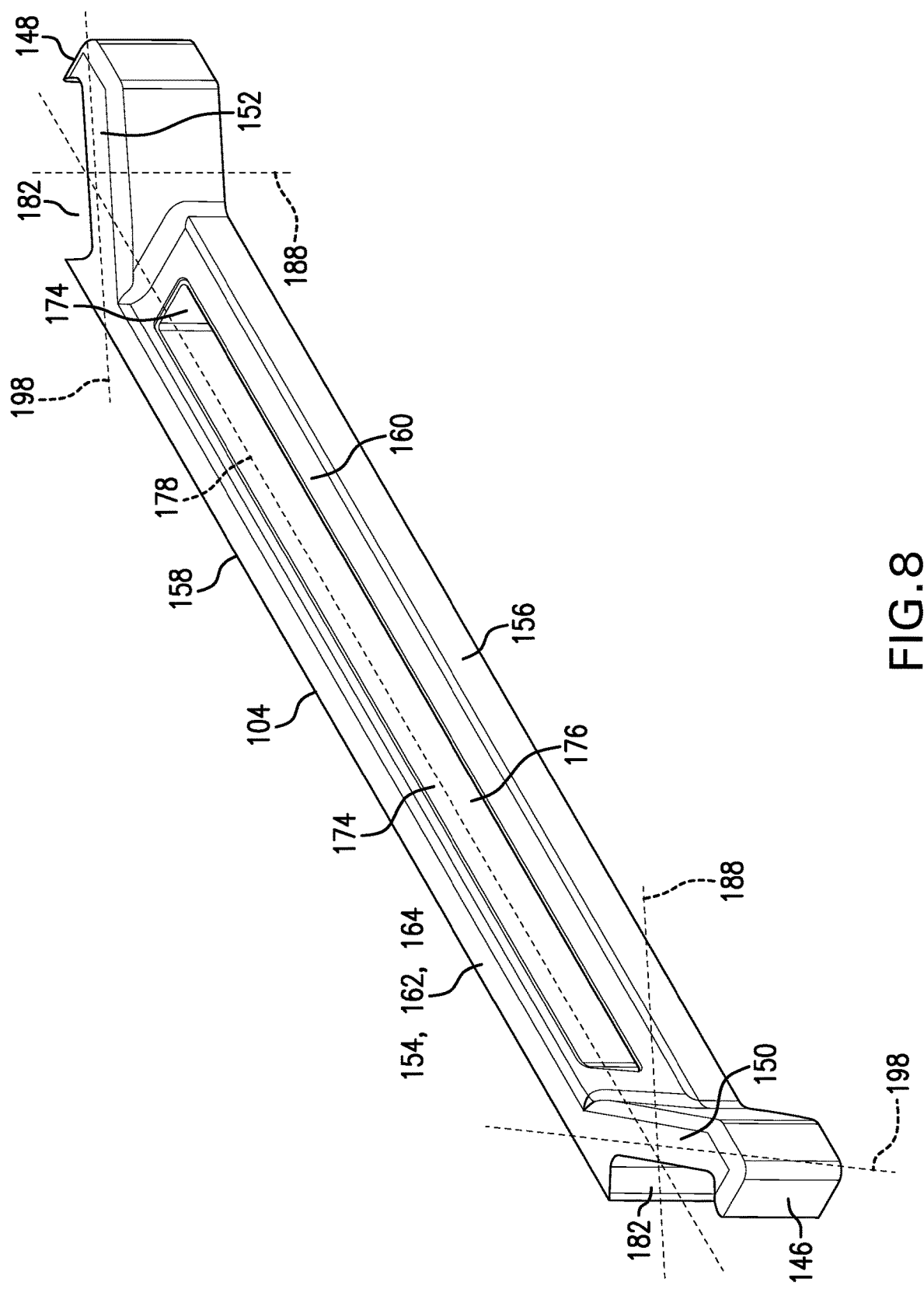
FIG. 8 illustrates a rear side perspective view of an exemplary side support of the point-of-sale station shown in FIG. 1.
Figure 9:
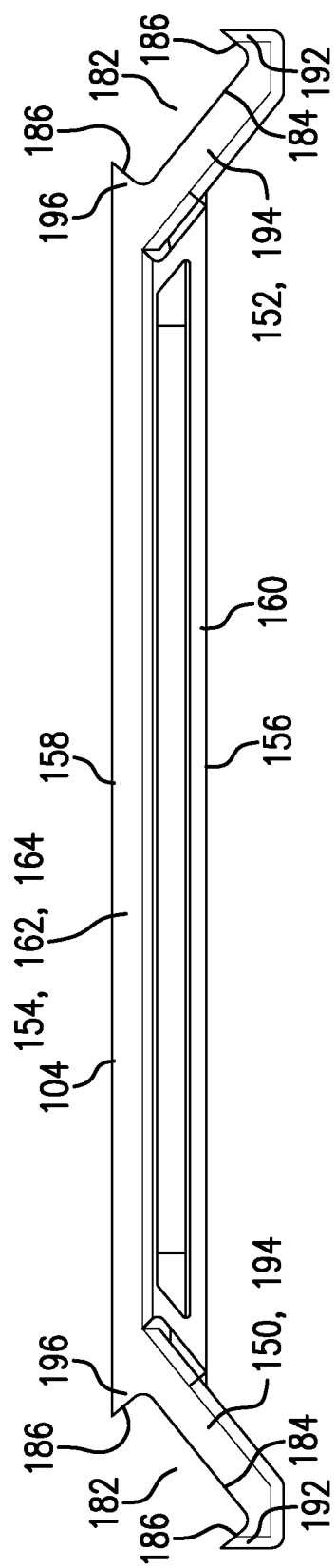
FIG. 9 illustrates a top side perspective view of the side support shown in FIG. 8.
Figure 11:
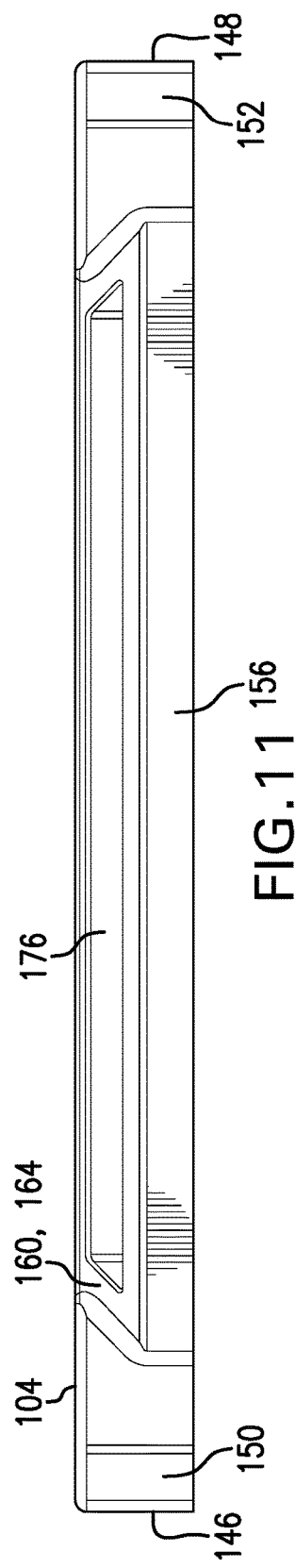
FIG. 11 illustrates a rear view of a portion of the side support shown in FIG. 8.
Figure 12:
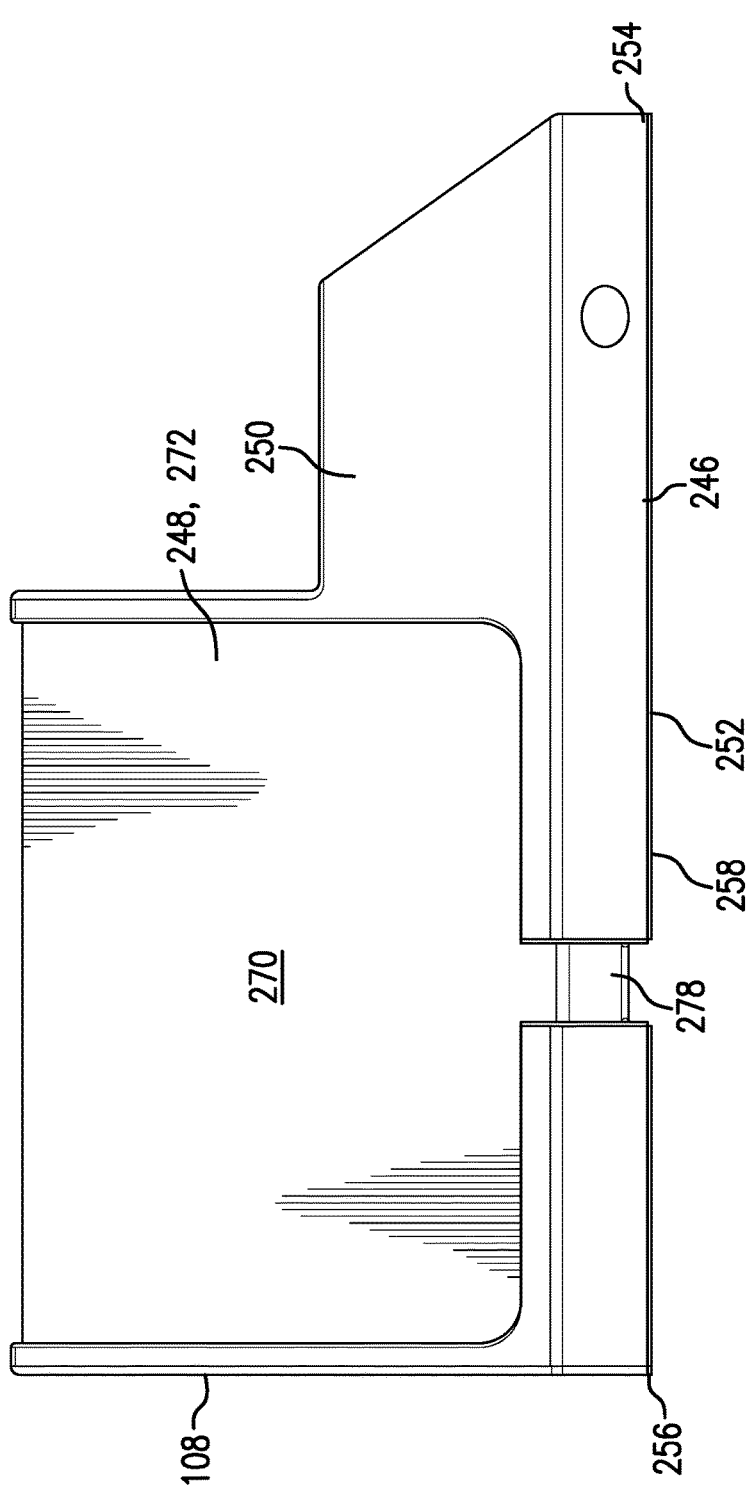
FIG. 12 illustrates a front view of an exemplary user interface stand of the point-of-sale station shown in FIG. 1.
Figure 13:
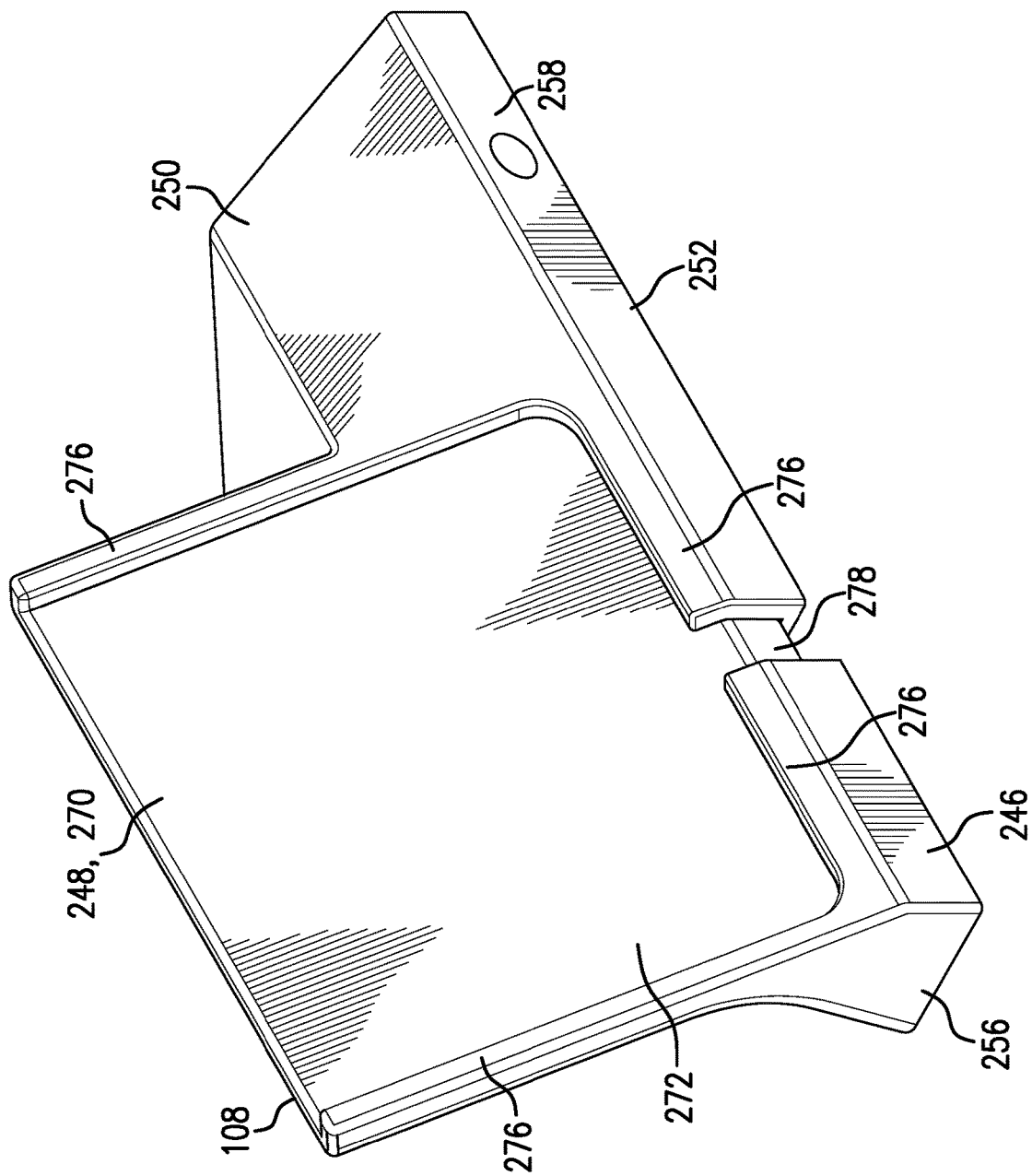
FIG. 13 illustrates a front side perspective view of the user interface stand shown in FIG. 12.
Figure 14:
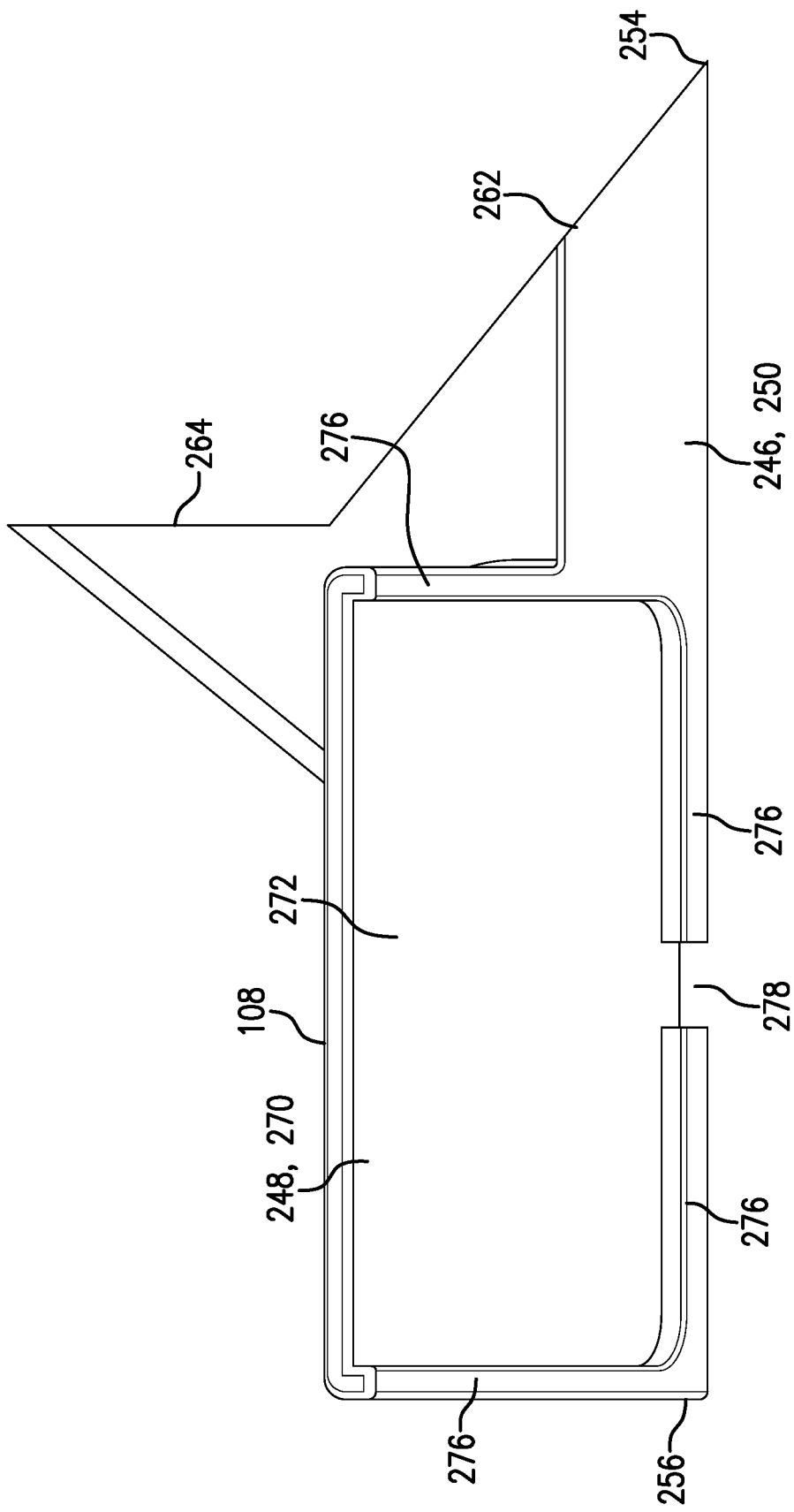
FIGS. 14 and 15 illustrate top and side views, respectively, of the user interface stand shown in FIG. 12.
Figure 15:
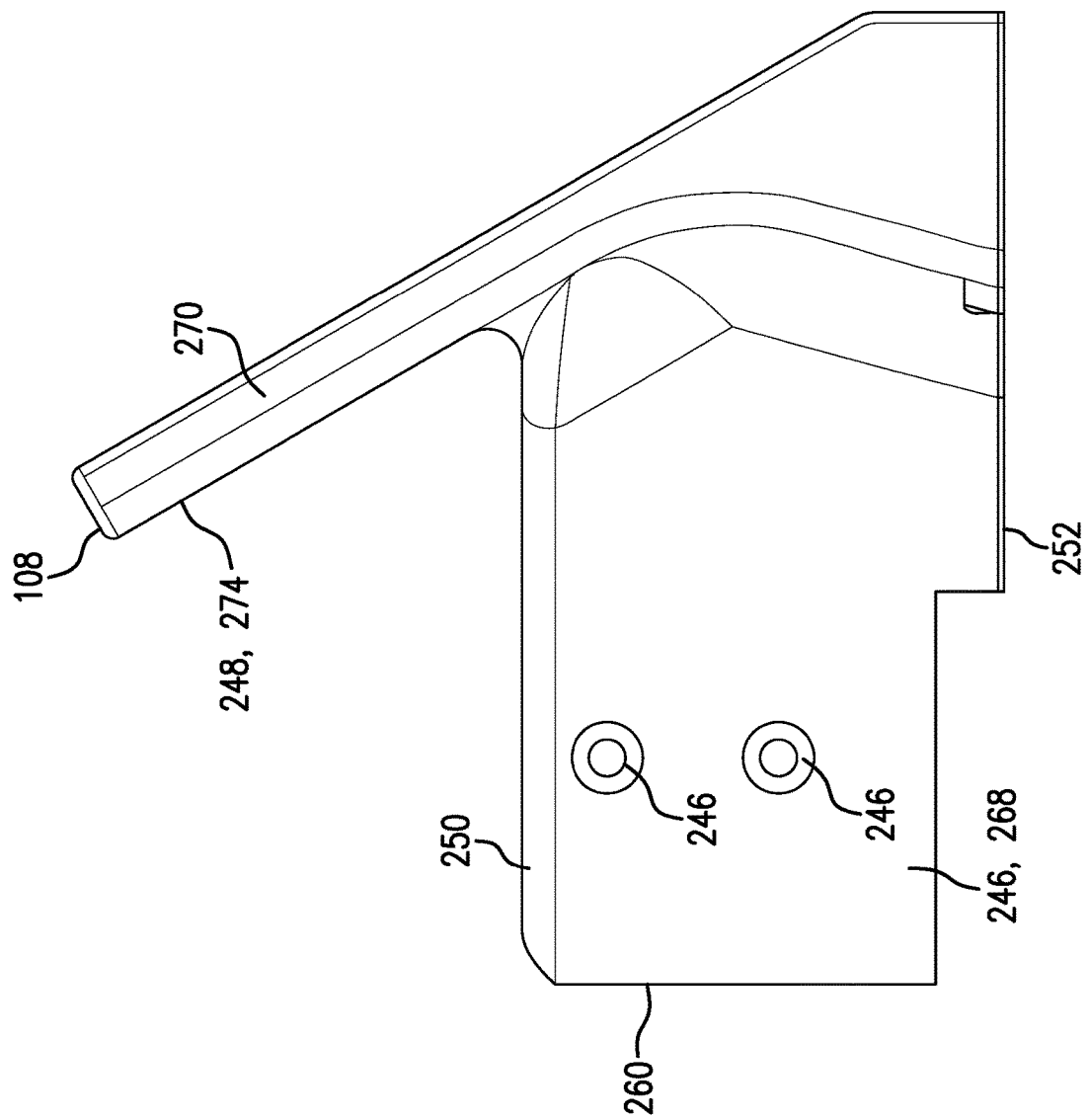

Referencing FIGS. 8, 9, and 11, the side support 104, which may or may not be constructed from a material similar to that used for the base portion 102, can extend between opposing first and second ends 146, 148 and can include a first attachment body 150, a second attachment body 152, and a support body 154. The side support 104 can further include opposing inner and outer sides 156, 158, the inner side 156 facing the checkout plane 122 when the side support 104 is secured to the base portion 102. The first and second attachment bodies 150, 152 can be on opposing ends 146, 148 of the side support 104, as well as opposing ends of and the support body 154. Thus, the first attachment body 150 can extend from the first end 146 of the side support 104 to the support body 154, and the second attachment body 152 can extend from the second end 148 of the side support 104 to the support body 154. According to certain embodiments, the side support 104 can have a length between the first and second ends 146, 148 of the side support 104 that is the same, or similar to, the length of the first and/or second side 116, 118 of the base portion 102. According to such an embodiment, when secured to the base portion 102, the first end 146 can be generally flush with the front side 118, and the second end 148 can be generally flush with the rear side 120 of the base portion 102.

The support body 154 can include a first portion 160 and a second portion 162. The first portion 160 can extend from the inner side 156 to the second portion 162, and the second portion 162 can extend from the first portion 160 to the outer side 158. As seen in FIGS. 8 and 11, an upper surface 164 of the support body 154 can extend in different directions for the first and second portions 160, 162. For example, when the side support 104 is secured to the base portion 102, the upper surface 164 of the support body 154 along the second portion 162 can extend along a plane that is generally parallel to the checkout plane 122 and/or the upper surface 110 of the base portion 102. However, the upper surface 164 of the first portion 160 can downwardly extend from, or relative to, the upper surface 164 of the second portion 162 in a direction toward the inner side 156. Such a downward sloping of the upper surface 164 along the first portion 160 of the support body 154 can assist in the delivery of a signal from a cue device 166 (FIG. 21) housed within at least the support body 154 to a user, including buyer and/or cashier, of the POS station 100. For example, such a configuration of the support body 154 can facilitate the delivery, or user recognition, of a light(s) emitted by a cue device 166 in the form of an illumination device 168 (FIG. 21), and/or an audible signal delivered from one or more speakers 170 of the cue device 166.

The cue device 166, which can be selectively operated in response to one or more signals generated by one or more processing devices 172 (FIG. 21), can be housed within at least a portion of the support body 154. With respect to embodiments in which the cue device 166 comprises an illumination device(s) 168, the illumination device 168 can be configured to, when activated, illuminate in at least one color that can be visible to a user of the POS station 100, including, but not limited to, a buyer or customer and a cashier, among others. Further, the illumination device 168 can be configured to use one or more types of lights, including, but not limited to, incandescent light and light emitting diodes (LED), among other types of lights. The illumination device 168 can be selectively controlled so as to provide illumination in a variety of different manners, including, for example, via use of multi-colored lights or a plurality of different colored lights. According to certain embodiments, the illumination device 168 can, when activated, be selectively illuminated in a variety of different illumination patterns and/or colors, including, for example, red, green, white and/or blue, as well as various combinations thereof, among other colors. The different illumination patterns and/or colors provided by selective control of the illumination device 168 can be utilized to convey a variety of information regarding the operation or status of the POS station 100. According to certain embodiments, the emission of colors by the illumination device 168 can be independent, or alternatively, dependent, on an illumination pattern. Thus, for example, in certain instances, use of different colors without changes in illumination patterns may be used to convey a first set of messages or information, and the further inclusion of a pattern, or multiple patterns, of illumination with one or more colors may be used to convey other, or additional, information. Thus, for example, the color red may be used to indicate a problem, while the use of the red color with different illumination patterns can be used to identify a type or category of problem.

Figure 21:
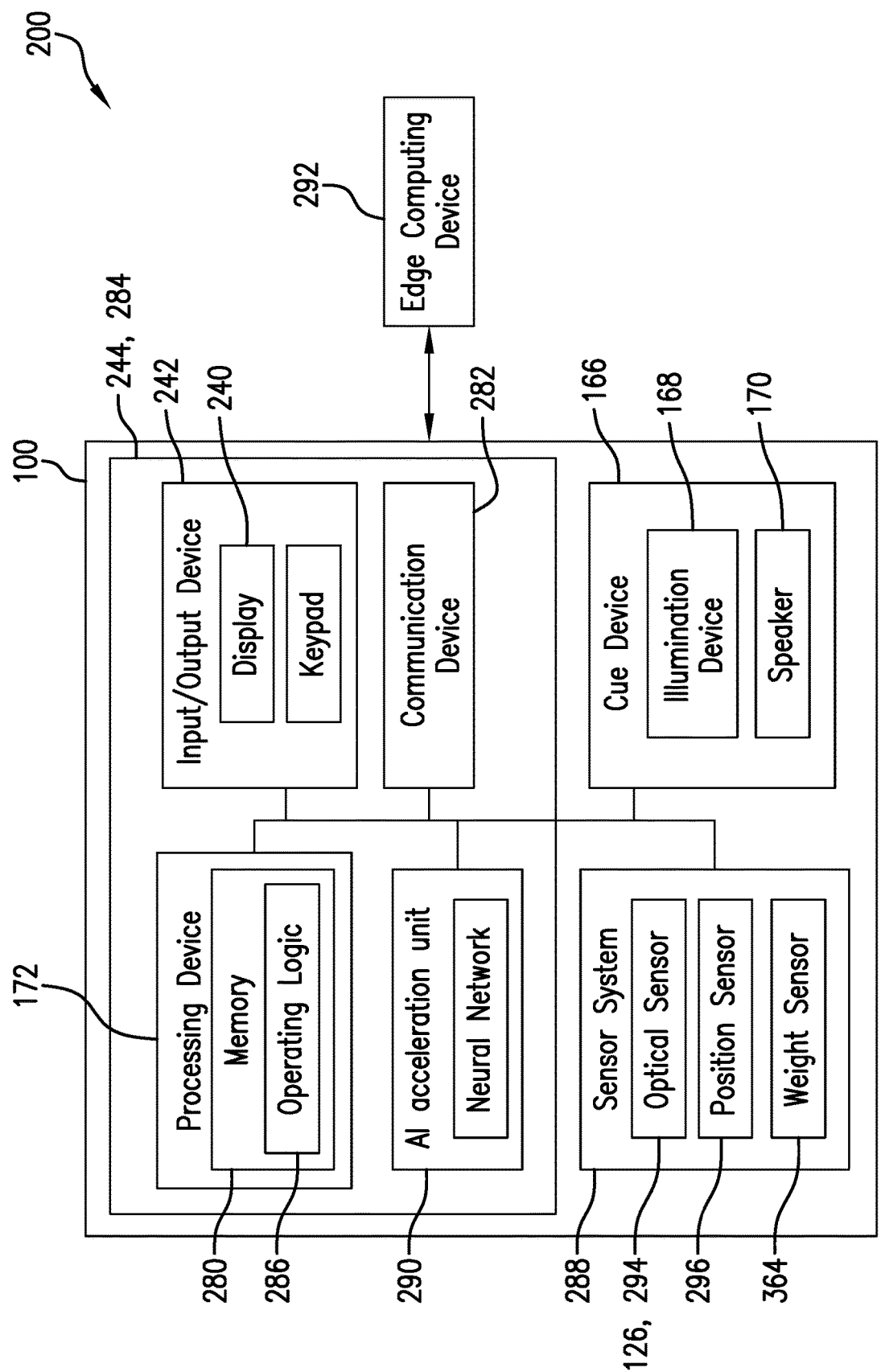
FIG. 21 illustrates a block diagram of an exemplary assisted checkout system.
Figure 22:
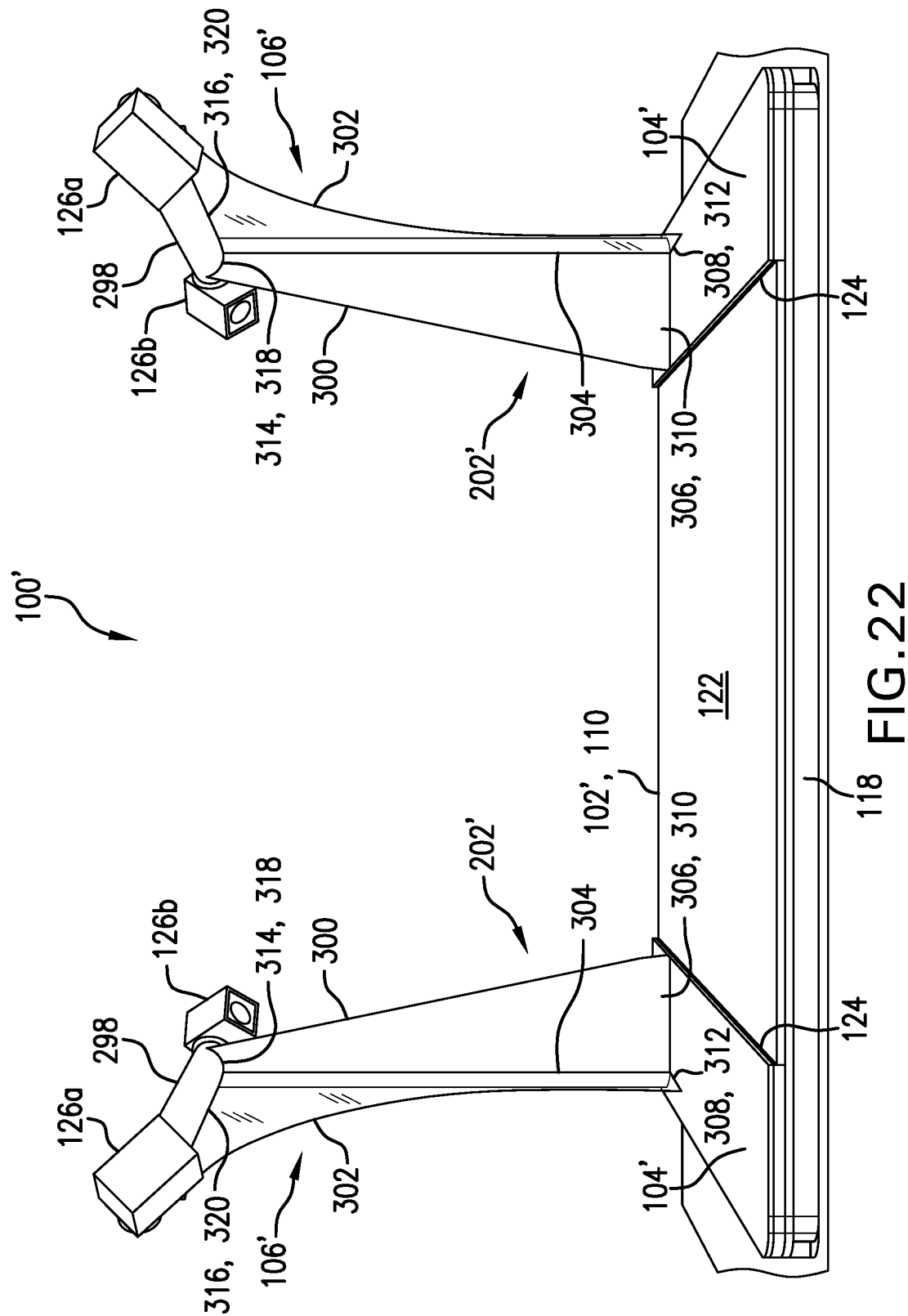
FIG. 22 illustrates a front view of another exemplary point-of-sale station for an assisted checkout system.

For example, according to certain embodiments, the illumination device 168 can be operated in response to one or more signals generate by the processing device 172 to illuminate in a first color indicating whether use of the POS station 100 has not yet commenced for a current checkout operation, a second color indicative of one or more items being placed outside of, or not within, the checkout plane, a third color indicative of completion of the current checkout operation, and a fourth color indicating one or more items placed on the checkout plane 122 are not recognized by the POS station 100 or the associated assisted checkout system 200 (FIG. 21.) Alternatively, or additionally, different illumination patterns, including, for example, variations, including duration, between being, and not being, illuminated (e.g., blinking in an on/off pattern), and/or alternating the illumination between two or more colors, can also be used to convey information regarding the operation or status of the POS station 100.

The operation of the illumination device 168 may, or may not, also coincide with the selective emission of one or more sounds from the speaker 170. For example, different tones from emission from the speaker 170 can be associated with one or more, but not all, colors and/or patterns that can be generated by operation of the illumination device 168. Thus, for example, a status of an operation of the POS station 100, or associated assisted checkout system 200, that results in the illumination device 168 being illumination to provide a first color (e.g., green light) and/or first illumination pattern, can be associated with the speaker 170 emitting a first tone, while a second status, and associated different second illumination color and/or pattern generated by the illumination device 168 can be associated with the speaker 170 emitting a second tone, the second tone being different than the first tone. However, according to other embodiments, the use, or operation of the speaker can be independent of the inclusion, or operation, of an illumination device 168.

As seen in FIGS. 8, 9, and 11, the support body 154 can include a plurality of cavity walls 174 that can generally define a cavity 176 in the support body 154 that can house at least the illumination device 168 and/or the speaker 170. The cavity 176 can extend along a central longitudinal axis 178 of the support body 154 toward the first and second ends 146, 148 of the support body 154 such that the length of the cavity 176 in the longitudinal direction is larger than a width of the support body 154 in a direction that extends from the inner side 156 to the outer side 158 and is generally orthogonal to the central longitudinal axis 178. Further, the cavity 176 can extend through the upper surface 164 of the support body 154 such that light illuminated from the illumination device 168, or sound from the speaker 170, can be emitted out from the support body 154. The support body 154 can further include a lens or cover 180 (FIG. 1) that extends across at least a portion of the cavity 176 at, or around, the upper surface 164. Such a cover 180 can be at least semi-transparent so as to accommodate the passage of light from the illumination device 168.

The first and second attachment bodies 150, 152 can each be configured to receive insertion of at least a portion of an adjacent support tower 106, as seen in at least FIG. 1. Further, similar to the lower recesses 134 of the base portion 102, the first and second attachment bodies 150, 152 can also include upper recesses 182 that can have configurations, including shapes and/or sizes, which may or may not be similar to the corresponding configurations and/or orientations of the lower recesses. Moreover, the upper recesses 182 can be configured to receive insertion of at least a portion of the support tower 106 that is also positioned in the adjacent lower recess 134. According to certain embodiments, the upper recesses 182 can be positioned to, when the side support 104 is secured to the base portion 102, be positioned above, and aligned with, the lower recess 134. According to such an embodiment, the upper recess 182 can generally be defined by an upper base wall 184 that extends between opposing upper edge walls 186, the upper edge walls 186 extending from the upper base wall 184 to the outer periphery of the side support 104. Thus, according to certain embodiments, similar to the lower recesses 134, the upper recesses 182 can each have a central axis 188 that bisects the upper base wall 184, and wherein the central axes 188 of one or more, if not all, of the upper recesses 182 intersect each other at a central point that may be vertically offset, and aligned with the above-discussed central point for the central axes 140 of the lower recesses 134. As mentioned above, the configuration and orientation of the upper recesses 182 can also assist in orienting an associated side support 104 such that the optical sensor 126 for that side support 104 is oriented to provide a predetermined field of view that includes at least a portion of the checkout plane 122. As seen in FIG. 8, according to the illustrated embodiment, the central axes 188 of the upper recesses 182 can be non-parallel, as well as non-orthogonal, to the central longitudinal axis 178 of the side support 104.

Figure 10:
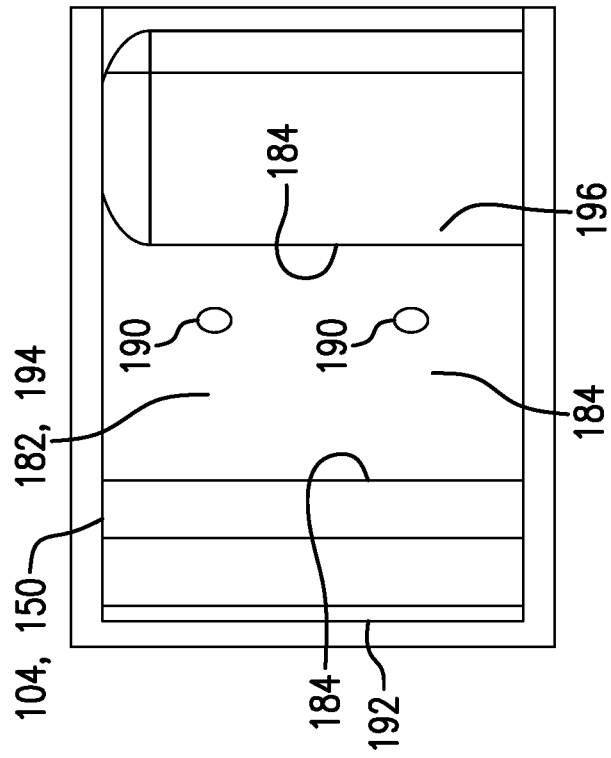
FIG. 10 illustrates a front view of a portion of the side support shown in FIG. 8.

The first and second attachment bodies 150, 152 can be configured to be coupled to a support tower 106 in a variety of manners. For example, referencing FIG. 10, the first and second attachment bodies 150, 152 can include one or more orifices 190 that are sized to receive a mechanical fastener that can attach at least a portion of a support tower 106 to the attachment body 150, 152. Additionally, or alternatively, the support tower 106 can be secured within the upper recess 182 via use of an adhesive or plastic weld. Further, the support tower 106, base portion 102, and/or side support 104 can be configured such that the support tower 106 vertically extends in a direction that is generally normal to the base portion 102 and/or checkout plane 122. According to certain embodiments, each of the attachment bodies 150, 152 can include a first leg 192, a base section 194, and a second leg 196, the base section 194 being positioned between the first and second legs 192, 196. According to such embodiments, the base section 194 can be configured to at least bend, deformation, or deflect relative to at least the first leg 192, and/or the second leg 196 can be configured for at least bending, deformation, or deflection relative to at least the base section 194. Such bending, deformation, or deflection of one or more portions of the attachment body 150, 152 can accommodate an interference, press, or snap fit between a portion of the support tower 106 and the corresponding attachment body 150, 152 that can assist in retaining a coupling between the support tower 106 and the side support 104.

According to certain embodiments, the first and second attachment bodies 150, 152 can extend along a centerline 198 of each of the attachment bodies 150, 152 that is non-parallel and non-orthogonal to both the longitudinal axis 178 of the support body 154 and the central axis 188 of the associated upper recesses 182. Additionally, as seen in FIG. 8, the centerline 198 of the first attachment body 150 can extend in a direction that is opposite to the direction of the centerline 198 of the second attachment body 152. Again, such angular orientation of the first and second attachment bodies 150, 152 can assist in orientating a field of view of an optical sensor 126 that is coupled to an associated support tower 106 so that the field of view of the optical sensor 126 captures at least a portion of the checkout plane 122, and, moreover, items located in the checkout plane 122.

FIGS. 16-19 illustrate an exemplary support tower 106 for the POS station 100. The support tower 106, which may or may not be constructed from a material similar to that used for the base portion 102, is configured to elevate one or more associated optical sensors 126 to a position to which at least a portion, if not all, of the checkout plane 122 is within the field of view of the associated optical sensor(s) 126. In the illustrated embodiment, each support tower 106 houses a different one of a plurality of optical sensors 126, as well as is used in fixing the height and orientation of the associated optical sensor 126. Each support tower 106 can include a riser portion 202 and a housing portion 206. The riser portion 202 can extend from a first end 204 of the support tower 106 to the housing portion 206, and the housing portion 206 can extend from the riser portion 202 to a second end 208 of the support tower 106. The riser portion 202 can also extend between opposing front and rear walls 210, 212 as well as opposing first and second sidewalls 214, 216. As seen in at least FIGS. 16 and 19, one or more orifices 218 can extend through the riser portion 202, including the front and rear walls 210, 212, that are each configured to receive insertion of a mechanical fastener that also extends into a matting orifice in an attachment member 150, 152, as discussed above. As seen in FIG. 1, according to certain embodiments, when the POS station 100 is assembled, the riser portion 202 vertically extends in a direction that is generally orthogonal to the upper surface 110 of the base portion 102, and has a vertical height that is larger than a width between the front and rear walls 210, 212, as well as between the first and second sidewalls 214, 216, of the riser portion 202.

Figure 16:
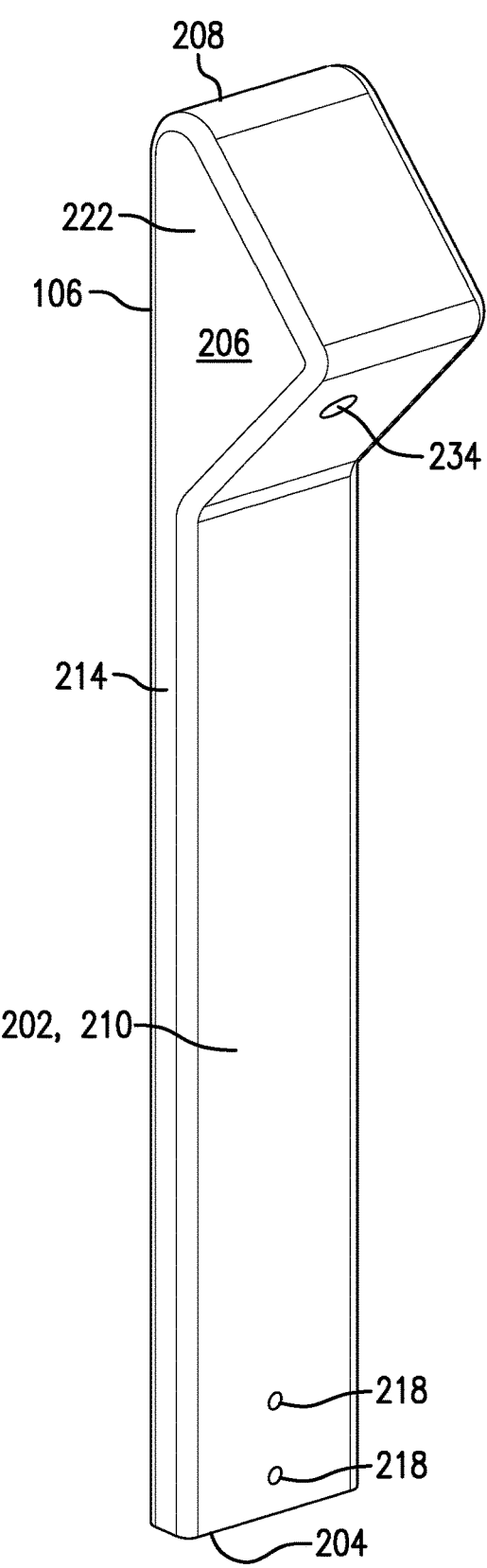
FIG. 16 illustrates a front side perspective view of an exemplary support tower of the of the point-of-sale station shown in FIG. 1.
Figure 17:
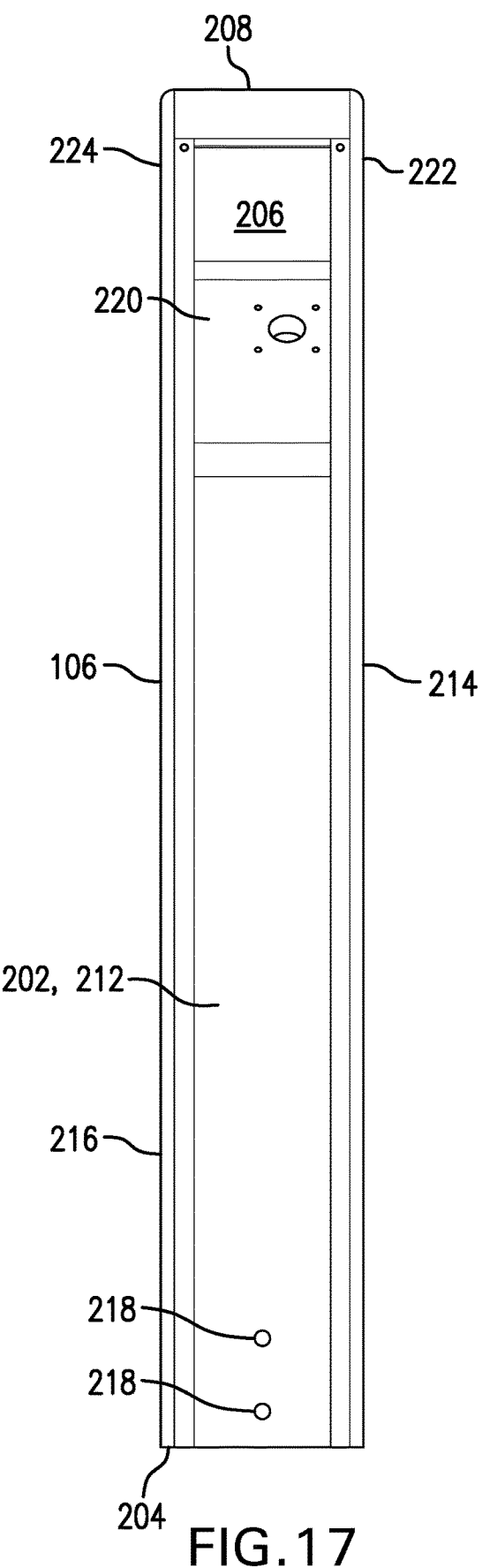
FIGS. 17, 18, and 19 illustrate rear, side, and front views, respectively, of the support tower shown in FIG. 16.
Figure 18:
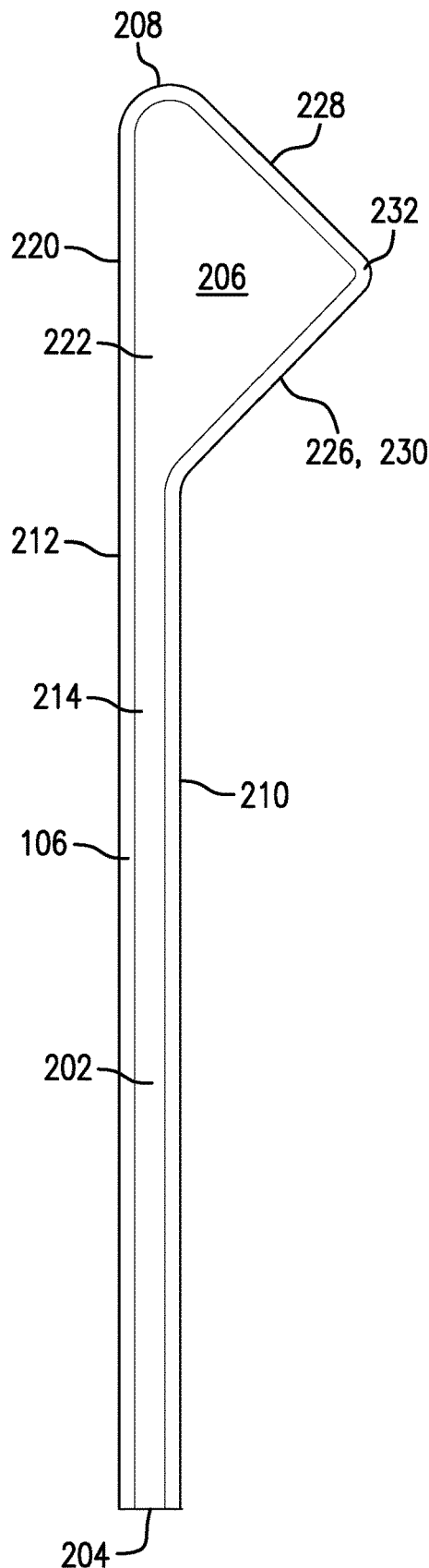
Figure 19:
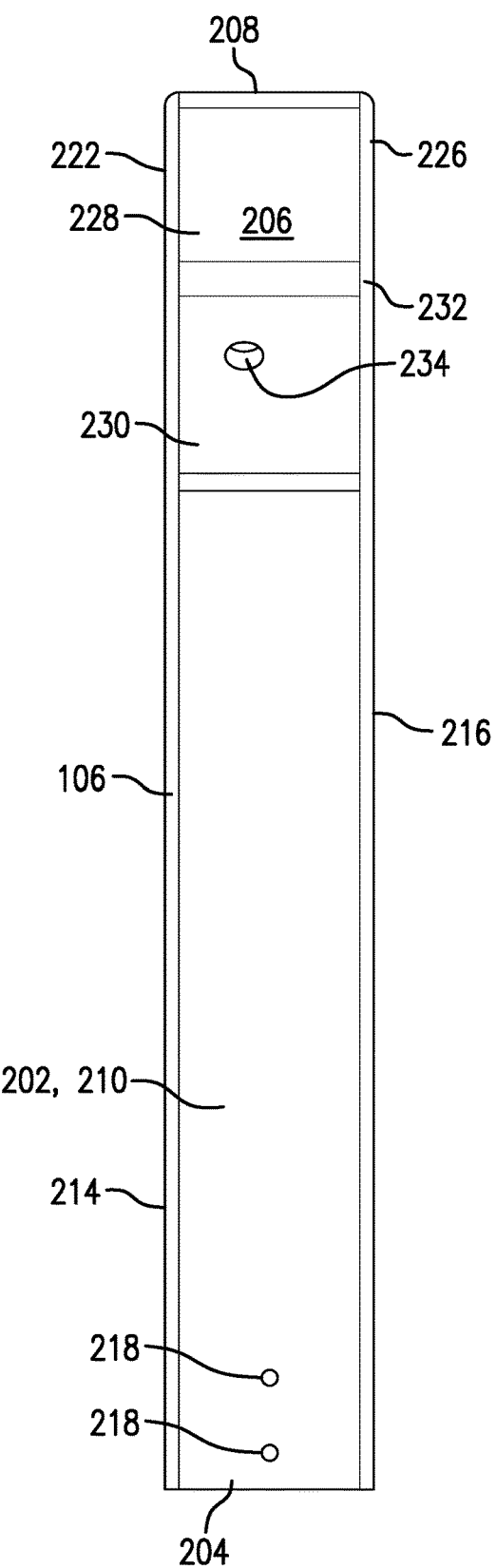

With respect to the embodiment of the support tower 106 shown in at least FIG. 16, a rear wall 220 of the housing portion 206 is generally coplanar with the rear wall 212 of the riser portion 202. Similarly, the first and second walls 222, 224 of the housing portion 206 are also generally coplanar with the first and second walls 214, 216, respectively, of the riser portion 202. The support tower 106 can further include a protrusion wall 226 having an upper portion 228 and a lower portion 230, the upper and lower portions 228, 230 extending in diverging directions from, or relative to, each other. For example, the upper and lower portions 228, 230 of the protrusion wall 226 can generally be joined or merge at or around an apex 232 of the protrusion wall 226. In such an example, the upper portion 228 can have a generally upwardly sloped surface that extends from the apex 232 and toward the second end 208 of the support tower 106. Similarly, the lower portion 230 of the protrusion wall 226 can be a generally downwardly sloped surface that extends from the apex 232 and toward the front wall 210 of the riser portion 202 of the support tower 106. Accordingly, as seen in at least FIG. 16, according to such an embodiment, the housing portion 206 can have a generally triangular side profile, among other profile shapes.

The housing portion 206 of the support tower 106 can include an internal aperture that can house at least a portion of an optical sensor 126. Further, as seen in at least FIG. 16 the lower portion 230 of the protrusion wall 226 can include an orifice 234 through which the optical sensor 126 can view of an area outside of, or around, the support tower 106. According to certain embodiments, support tower 106 can maintain the optical sensor 126 at a relatively static position relative to the riser portion 202 or other portions of the POS station 100. Moreover, the support tower 106 can provide rigid posts that are attach to the base portion 102 in a manner that fixes the positions and orientations of the support towers 106, as well as the optical sensors coupled to the support towers 106, relative to the base portion 102 and the checkout plane 122. Such a configuration allows the optical sensors 126 to be fixedly coupled to the base portion 102, which can provide the advantage of the POS station 100 being capable of being provided (e.g., shipped to a store) either as a single component that is already fully assembled or as a small number of components that are easily assembled, e.g., without special tools, training, or instructions. Moreover, the configuration of the base portion 102, side support 104, and/or support tower 106 are configured such that, when assembled, the desired or determined placements, including height, and orientations of the optical sensors 126 can be attained in a manner that can be unalterable during the regular course of checkout use, thus ensuring consistency of operation over the lifetime of the POS station 100. Alternatively, according to other embodiments, the optical sensor 126 can be selectively displaced along one or more axes, if not a plurality of axes, so that the field of view of the optical sensor 126 is adjustable relative to at least the checkout plane 122.

A variety of different types of sensors, or combinations of sensors, can be utilized for the optical sensors 126. For example, according to certain embodiments, the optical sensor can comprise a camera, such as, but not limited to, a digital camera, two-dimensional camera, two-dimensional sensor, stereo depth camera, stereo sensor, RGBD (red, green, blue, depth) camera, three-dimensional sensor, and/or three-dimensional camera, as well as combinations thereof, among other cameras. Further, the number of optical sensors 126 can vary. For example, with respect to the embodiment shown in FIG. 1, the optical sensor 126 of the POS station 100 can comprise four cameras, each camera being secured to a different support tower 106. However, according to other embodiments, the number of cameras, and/or the number of cameras secured to each support tower 106, can vary. Additionally, as discussed herein, the POS station 100 can include other, or additional, optical sensors 126, including cameras, which may not be secured to a support tower 106. For example, according to certain embodiments, an overhead optical sensor can be placed directly above the checkout plane 122, e.g., directly above about the geometric center of the checkout plane 122, and oriented to look directly down on the checkout plane 122 and items placed thereon, and generally normal to the upper surface 110 of the base portion 102. In other embodiments, the base portion 102 or substrate 130 can be transparent such that an optical sensor 126 can be positioned below the checkout plane 122, and oriented to look directly up at the checkout plane 122 and items placed thereon.

While the POS station 100 illustrated in at least FIG. 1 depicts a plurality of optical sensors 126 coupled to support towers 106 that are secured to a base portion 102, according to other embodiments, the POS station 100 may not include the base portion 102. According to such embodiments, rather than being coupled to support towers 106 that are secured to a base portion 102, the optical sensors 126 can be suspended from a location overhead of the checkout plane 122. For example, the optical sensors 126 can be rigidly affixed to a frame or ring that can be hung from a ceiling of a store.

The optical sensors 126 can be positioned with the focal points of the optical sensors 126 being above the checkout plane 122. The height at which the focal points of the optical sensors 126 are above the checkout plane 122 can be the same for each of the optical sensors, or, different for one or more, if not all, of the optical sensors 126. Additionally, the focal points for each of the optical sensors 126 may, or may not, be the same. For example, the focal points of the optical sensors 126 can, according to certain embodiments, be positioned above the base portion 102 in the vertical direction (as generally indicated by the direction "$h_1$" in FIG. 20) at an optical sensor height of between about 10 inches and about 25 inches, e.g., between about 15 inches and about 20 inches, and, more particularly, at about 18.1374 inches. Additionally, according to certain embodiments, the optical sensors 126 can each be positioned with their focal points offset from the geometric center of the checkout plane 122 by about 15.5 inches in a first horizontal dimension and by 11.5 inches in a second horizontal dimension. In other examples, the respective horizontal positions of the optical sensors 126 can vary and can depend on the size of the base portion 102 and/or the fields of view of the respective optical sensors 126.

Figure 20:
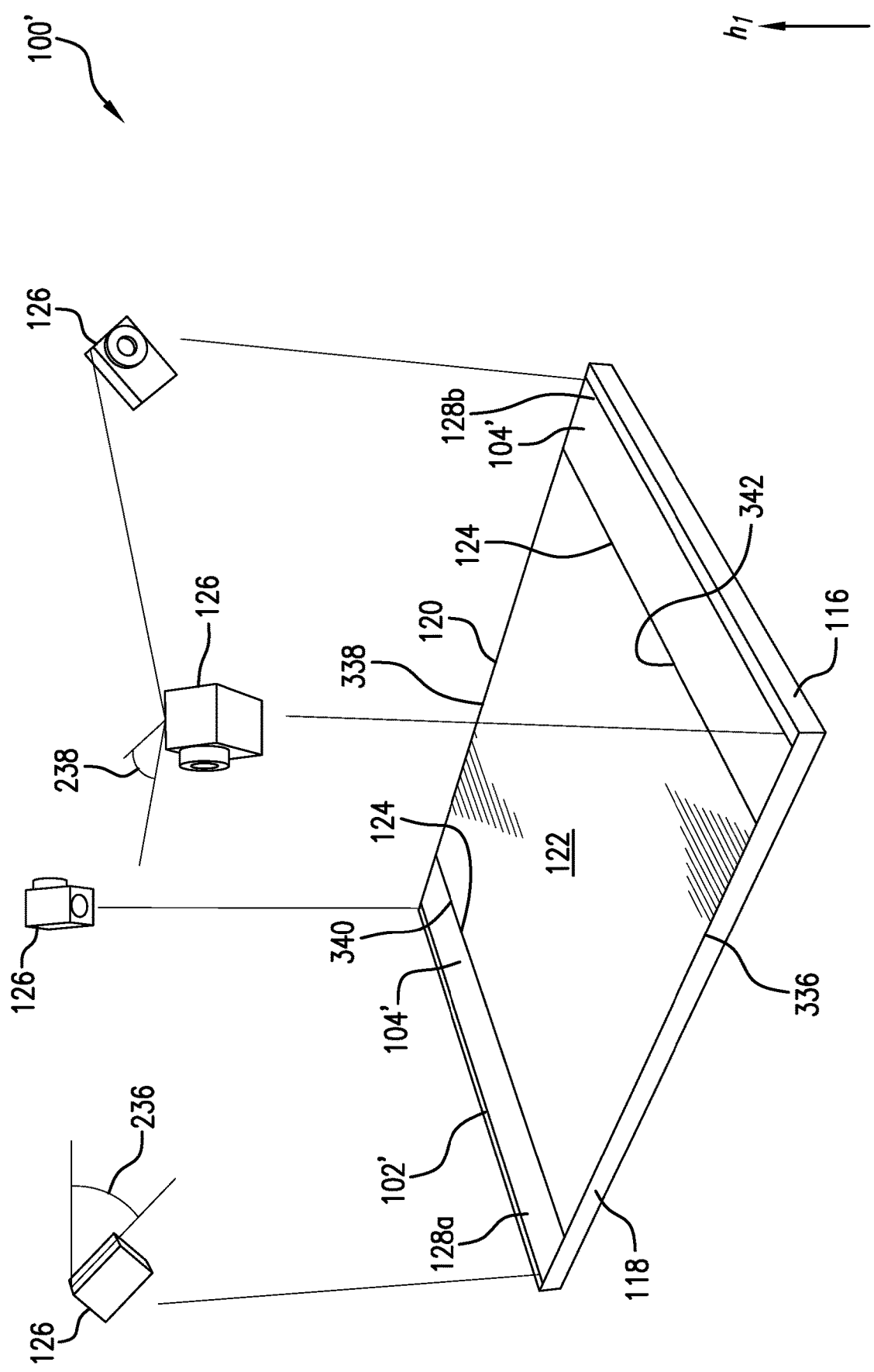
FIG. 20 illustrates a representation of an exemplary arrangement of a plurality of optical scanners positioned about a point-of-sale station.

As illustrated by a least FIGS. 1 and 20, a plurality of the optical sensors 126 can be positioned above, and oriented downward and inward to observe the checkout plane from different angles. Moreover, the optical sensors 126 can be oriented to look down at the checkout plane 122 so as to have a variety of views of items placed on the checkout plane 122. According to certain embodiments, the optical sensors 126 can each be oriented to have their respective optical axes point at about a same point in three-dimensional space (e.g., at a point above the geometric center of the checkout plane 122), as in the illustrated example, or in other examples they can each be oriented to have their respective optical axes point at different respective points in three-dimensional space above the checkout plane 122. As seen in FIG. 20, the optical sensors 126 can each be oriented at a downward vertical angle (a downward tilt angle) 236 that can be dependent on their respective camera heights above the checkout plane 122. As an example, the optical sensors 126 can each be oriented at a downward tilt angle 236 of between about 40° and about 50°, e.g., about 44°, from level horizontal. The optical sensors 126 can each be oriented at an inward horizontal angle (an inward pan angle) 238 that can be dependent on their respective horizontal-dimension positions with respect to the geometric center of the checkout plane 122. As an example, the optical sensors 126 can each be oriented at an inward pan angle 238 of between about 30° and about 50°, e.g., between about 39° and about 40°, as measured, for example, relative to the first direction ("$d_1$") in the illustrated direction. It should be appreciated that the downward title angle 236 and the inward pan angle 238 of each of the optical sensors 126 may be independent of those of the other optical sensors 126 (e.g., as dictated by the heights and/or other geometrical relationships of the respective optical sensors 126).

Referencing FIGS. 1, 2, and 12-15, according to certain embodiments, the POS station 100 can include at least one user interface stand 108a, 108b that can be coupled to, for example, a visual display 240a, 240b, including a computing device that includes a visual display 240a, 240b. Moreover, as seen in at least FIGS. 1 and 2, according to certain embodiments, the POS station 100 can include a plurality of tablet or user interface stands 108a, 108b (generally referred to herein as user interface stand 108). The first user interface stand 108a can, according to certain embodiments, be utilized with a first, customer-facing visual display 240a, and the second user interface stand 108b can be utilized with a second, cashier-facing visual display 240b.

In the illustrated embodiment, the first user interface stand 108a can generally extend from a first support tower 106a at an intersection of the front side 118 and the first side 114 of the base portion 102, and the second user interface stand 108b can extend from another, such as second, support tower 106b generally located at an intersection of the rear side 120 and the first side 114 of the base portion 102. Further, the first and second user interface stands 108a, 108b can outwardly extend away from the base portion 102 at opposing, or diverging directions that are neither parallel nor perpendicular to the first side 114, second side 116, front side 118, and/or the rear side 120 of the base portion 102. Such an angular orientation of the user interface stands 108a, 108b can assist with the buyer and/or cashier having access, including visual access, to an input/output (I/O) device 242 that is either part of, or being supported by, the user interface stand 108 while the POS station 100 is use.

A variety of different types of I/O devices 242 can be housed and/or supported by the user interface stand 108, including, but not limited to, a display, keyboard, touch screen, mouse, keypad, joystick, microphone, and/or speaker, as well as various combinations thereof, among other types of I/O devices 242. According to certain embodiments, the user interface stand 108 can be adapted to accommodate selective insertion and removal of a computing device 244 that can provide the I/O device 242, including, for example, a tablet or smart phone, among other types of computing devices.

As seen in at least FIGS. 12-15, according to certain embodiments, the user interface stand 108 can include a base segment 246 and a support segment 248, the support segment 248 generally upwardly extending from the base segment 246. The base segment 246 can include an upper surface 250 and an opposing lower surface 252, at least a portion of the lower surface 252 being configured to be seated on a surface, such as, for example, a checkout counter, among other surfaces, upon which the POS station 100 can be placed. Additionally, the base segment 246 can be configured to abut, or be generally adjacent to, the base portion 102, side support 104, and/or the support tower 106. For example, the base segment 246 can extend from a first end 254 to a second end 256 of the user interface stand 108, as well as from a front side 258 to a rear side 260 of the user interface stand 108. The first end 254 can include a first segment 262 and a second segment 264. The first segment 262 can be oriented to abut one of the front or rear sides 118, 120 of the base portion 102, while the second segment 263 is oriented to about against a rear wall 212 of a riser portion 202 of a support tower 106 when the riser portion 202 is secured to the base portion 102 and/or an attachment body 150, 152 of the side support 104. According to certain embodiments, the first segment 262 can be non-parallel and non-orthogonal to the second segment 264, and, moreover, can be separated from the second segment 264 by an obtuse angle. For example, according to certain embodiments, the first segment 262 be separated by the second segment 264 by an angle of about 120 degrees. Additionally, one or more orifices 266 can extend from a sidewall 268 at the second end 256 of the user interface stand 108 to the second segment 264 that can receive a mechanical fastener that can extend into a corresponding orifice 266 in the riser portion 202, as discussed above.

The support segment 248 can vertically extend away from the base portion 102 in a vertical upwardly and outwardly sloped direction relative to at least the front side 118 of the base portion 102. Such a slanted or tilted orientation of the support segment 248 can assist with the ability of the buyer and/or cashier to view at least the display 240a, 240b, including, but not limited to information displayed on a display 240a, 240b or to be inputted by the buyer or cashier via use of an I/O device 242. In the illustrated embodiment in which the support segment 248 is used to support a computing device 244, such as, for example, a tablet, the support segment 248 can include a back wall 270 having an inner face 272 and an outer face 274, the inner face 272 providing a surface against which a backside the computing device 244 can rest or abut. The support segment 248 can also include a retention wall 276 that can extend about, or be adjacent to, a portion of an outer periphery of the inner face 272. Moreover, the retention wall 276 can extend along at least portions of opposing sides of the inner face 272 so as to restrict movement of the I/O device 242 and/or display 240a, 240b in at least horizontal directions, well as extend across a lower portion of the inner face 272 so as to vertically support the I/O device 242 and/or display 240a, 240b. A channel 278 can also vertically extend through the base portion 102 and the support segment 248 that is configured and positioned to provide an area at which a power and/or data cable and an associated connector, socket, port or plug, including, for example, a USB connector, can be positioned to be matingly engaged or connected, to a corresponding connector and/or cable of the I/O device 242 and/or display 240a, 240b.

FIG. 21 illustrates a block diagram of an exemplary assisted checkout system 200 that includes at least one, if not a plurality, of the POS stations 100. As shown, the assisted checkout system 200 can include one or more processing devices 172. While the processing device 172 is illustrated in FIG. 21 as being part of the POS station 100, according to certain embodiments, the processing device 172 can be positioned in other portions of the assisted checkout system 200, or, alternatively, the assisted checkout system 200 can include at least one processing device 172 at the POS station(s) 100 and at least one other processing device 172 at one or more other locations and/or in association with one or more other components or devices that can be part of, including used with, the assisted checkout system 200. Moreover, the processing device 172, among other components, including a memory(ies) 280, communication unit(s) 282, and/or I/O device(s) 242, can be distributed across multiple computing devices 244. For example, according to certain embodiments, the processing device 172 can be part of a computing device 244, also referred to herein as an extreme edge computing device 284 of, or communicatively coupled to, the POS station 100 that can be concealed underneath a checkout counter on which the POS station 100 is placed, or in a nearby drawer or cabinet or other secure location. In other examples, the extreme edge computing device 284 can be integrated into the base portion 110, or otherwise into some other part of the POS station 100. The extreme edge computing device 284 can be any computing system capable of at least receiving and processing video streams from one or more optical sensors 126. The extreme edge computing device 284 can be embodied as a desktop computer, laptop computer, tablet computer, notebook, netbook, ULTRABOOK, mobile computing device, cellular phone, smartphone, wearable computing device, server, personal digital assistant, Internet of Things (IOT) device, processing system, gateway, and/or any other computing, processing, and/or communication device capable of performing the functions described herein.

The processing device 172 may be any type of processor(s) capable of performing the functions described herein. In particular, the processing device 172 may be one or more single or multi-core processors, microcontrollers, or other processor or processing/controlling circuits. For example, according to certain embodiments, the processing device 172 may include or be embodied as an arithmetic logic unit (ALU), central processing unit (CPU), digital signal processor (DSP), AI acceleration unit, graphics processing unit (GPU), tensor processing unit (TPU), and/or another suitable processor(s). The processing device 172 may be a programmable type, a dedicated hardwired state machine, or a combination thereof. Processing devices 172 with multiple processing units may utilize distributed, pipelined, and/or parallel processing in various embodiments. Further, the processing device 172 may be dedicated to performance of just the operations described herein, or may be utilized in one or more additional applications. In the illustrative embodiment, the processing device 172 is programmable and executes algorithms and/or processes data in accordance with operating logic 286 as defined by programming instructions (such as software or firmware) stored in memory 280. Additionally or alternatively, the operating logic 286 for processing device 172 may be at least partially defined by hardwired logic or other hardware. Further, the processing device 172 may include one or more components of any type suitable to process the signals received from an I/O device 242 or from other components or devices and to provide desired output signals. Such components may include digital circuitry, analog circuitry, or a combination thereof.

The memory 280 may be of one or more types of non-transitory computer-readable media, such as a solid-state memory, electromagnetic memory, optical memory, or a combination thereof. Furthermore, the memory 280 may be volatile and/or nonvolatile and, according to certain embodiments, some or all of the memory 280 may be of a portable type, such as a disk, tape, memory stick, cartridge, and/or other suitable portable memory. In operation, the memory 280 may store various data and software used during operation of the extreme edge computing device such as operating systems, applications, programs, libraries, and drivers. The memory 280 may store data that is manipulated by the operating logic 286 of processing device 172, such as, for example, data representative of signals received from and/or sent to the I/O device 242 in addition to or in lieu of storing programming instructions defining operating logic 286. As shown in FIG. 21, the memory 280 may be included with the processing device 172 and/or coupled to the processing device 172 depending on the particular embodiment. For example, according to certain embodiments, the processing device 172, the memory 280, and/or other components of the extreme edge computing device 284 may form a portion of a system-on-a-chip (SoC) and be incorporated on a single integrated circuit chip.

According to certain embodiments, various components of the extreme edge computing device 284 (e.g., the processing device 172 and the memory 280) may be communicatively coupled via an input/output subsystem, which may be embodied as circuitry and/or components to facilitate input/output operations with the processing device 172, the memory 280, and other components of the extreme edge computing device 284. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The processing device 172 can execute algorithms and/or process data in accordance with operating logic 286, the I/O device 242, which can enable communication between the extreme edge computing device 284 and one or more external devices, and the memory 280 which that stores, for example, data received from the external device via the I/O device 242 and/or a communication unit 282.

The communication unit 282 can allow the extreme edge computing device 284 to communicate with the external device. For example, the communication unit 282 can include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the extreme edge computing device 284 can be configured to use any one or more communication technologies (e.g., wireless or wired communications) and associated protocols (e.g., Ethernet, Bluetooth®, Wi-Fi®, WiMAX, etc.) to affect such communication depending on the particular extreme edge computing device 284. The communication unit 282 can also include hardware, software, and/or firmware suitable for performing the techniques described herein.

One or more of the processing devices 172 can be communicatively coupled, such as, for example, via a wired or wireless connection, to a sensor system 288 of the POS station 100 that can include one or more of the optical sensors 126. Thus, such a processing device(s) 172 can, for example, be configured to receive and process captured information, including, for example, video streams, from the plurality of optical sensors 126, including cameras, of the POS station 100, among other optical sensors 126. For example, according to certain embodiments, the processing device 172 can run software that provides a computer vision backend for the POS station 100, recognizing items placed on the checkout plane 122 using information stored on a database and/or memory 280 regarding known items. Such machine-vision-based recognition or identification of items placed on the checkout plane 122 can be based on a variety of optically identifiable criteria that does not require individual scanning of identifying or coded markings (e.g., UPC barcodes) for those items. Moreover, with captured information, such as, for example, video streams, from their respective optical sensors 126, each extreme edge computing device 284 can derive and output metadata indicative of items detected on a checkout plane 122 of the respective POS station 100.

The optical sensors 126 of each POS station 100 can be coupled to one or more processing devices 172, including, for example, the processing device 172 of an extreme edge computing device 284, using any suitable wired or wireless link or protocol. Providing communicative links between the optical sensors 126 and a processing device(s) 172 as direct wired links, e.g., over USB, as opposed to indirect wired links or wireless links, e.g., over internet protocol (IP), can provide dependability and robustness advantages, in that each assisted checkout system need not be reliant on local area network (e.g., Wi-Fi) internet connectivity within the store, which may be slow, congested, or intermittent. Further, the optical sensors 126 of each POS stations 100 can, according to certain embodiments, be communicatively coupled to a processing device 172 of an extreme edge computing device 284 of that particular POS station 100. Accordingly, the optical sensors 126 of a first POS station 100 and the optical sensors 126 of one or more other POS stations 100 may not be communicating captured information for machine recognition to the same processing device 172. Alternatively, according to other embodiments, a common processing device 172 can be shared by a plurality of POS stations 100. For example, according to certain embodiments, a single extreme edge computing device 284 can be coupled to the optical sensors 126 from multiple (e.g., two or more) POS stations 100 and can perform captured information, such as video stream, receipt and processing functions for each of the multiple POS stations 100 for which it is connected to optical sensors 126. The handling of multiple POS stations 100 by a single extreme edge computing device 284 can reduce system costs and increases operational efficiency.

As previously mentioned, the POS station 100, including the extreme edge computing device 284, can include an I/O device 242, including, for example, one or more visual displays 240a, 240b that can provide a frontend for the POS station 100. Each of the visual displays 240a, 240b, for example, can be a tablet computing device having a touchscreen, as illustrated, for example, in at least FIG. 1. The one or more visual displays 240 collectively form a frontend for the POS station 100 that can be configured to display the checkout list generated by the backend. As previously discussed, and as seen in at least FIGS. 1 and 2, according to certain embodiments, the POS station 100 can be provided with a first, customer-facing visual display 240a and a second, cashier-facing visual display 240b. The second, cashier-facing visual display 240b can, according to certain embodiments, provide an interactive user interface (UI), e.g., a graphical user interface (GUI), permitting a cashier to add or remove items to or from the checkout list automatically generated by the backend. Moreover, the POS station 100, or associated processing device 172, can be configured such that the second display 240b can provide at least some information and/or capabilities to a cashier that are not provided to the first, customer-facing visual display 240a. Further, the first, customer-facing visual display 240a can be equipped with payment acceptance functionality (e.g., a reader for a credit card or mobile phone) and can, according to certain embodiments, provide an interactive UI or GUI permitting a customer to tender cashless payment via the first visual display 240a.

According to certain embodiments, the extreme edge computing device 284 can include, or be communicatively coupled to, an AI acceleration unit 290, e.g., a graphics processing unit (GPU) or tensor processing unit (TPU), to provide the computing capability that may be required to process captured information, including video streams, captured by operation of the optical sensors 126. Further, according to certain embodiments, the extreme edge computing device 284 can include a complete computer system with the AI acceleration unit 290 and a heat sink in a self-contained package.

Each extreme edge computing device 284 can be wired or wirelessly coupled to one or more external computing devices, which can be referred to herein as an edge computing device, that, among other locations, can be located on-site within a store of a retailer that utilizes one or more of the POS stations 100. According to certain embodiments, the edge computing device 292 can be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, according to certain embodiments, the edge computing device 292 may be integrated into the extreme edge computing device 284.

The edge computing device 292 can be any type of device that allows data to be inputted or outputted from the extreme edge computing device 284. Accordingly, the edge computing device 292, and can be communicatively coupled to the extreme edge computing device 284 in a variety of manners, including, for example, over various network connections such as an Ethernet or Wi-Fi local area network (LAN) using an internet protocol. According to certain embodiments, a location, such as, for example, a store, can be provided with multiple edge computing devices 292. Similar to the extreme edge computing devices 284, each edge computing device 292 can be equipped with an AI acceleration unit (e.g., GPU or TPU) to provide the computing capability that may be required to train, or re-train machine learning (ML) models as described in greater detail below.

According to certain embodiments, one or more optical sensors 126 in the form of cameras associated with POS station 100 can connect directly to the edge computing device 292, rather than to the corresponding extreme edge computing device 284. For example, according to certain embodiments, the POS station 100 can have four optical sensors 126 in the form of USB cameras that are coupled an associated extreme edge computing device 284, and a fifth optical sensor 294 (FIG. 27), such as, for example, an overhead internet protocol (IP) camera that is not coupled to a support tower 106 and that streams via wired or wireless connection to the store's edge computing device 292. According to certain embodiments, metadata derived from the video stream data from the fifth, overhead optical sensor 294 (e.g., overhead IP camera), as discussed below with respect to FIG. 27, can be generated at the edge computing device 292, and can be merged at the edge computing device 292 with metadata generated at the extreme edge computing device 284 that was derived from the video stream data from the four USB cameras. Such merging of data from can provide an enhanced interpretation of the scene observed by all five cameras associated with the POS station 100. The combination of AI-acceleration-unit-enabled extreme edge computing devices 284 and an AI-acceleration-unit-enabled edge computing device 292 can thus result in more efficient distribution of data processing tasks while simplifying infrastructure setup and maintenance and reducing network bandwidth that would otherwise be associated with streaming all optical sensor 126 outputs directly to an edge computing device 292 over a local area network. Although described by way of example as connecting to another fifth, overhead optical sensor 294, it should be appreciated that many optical sensors 126 can connect directly to the edge computing device 292 (e.g., some or all of the cameras in an existing security camera infrastructure) in some embodiments.

In connection with the processing device 172 of either, or both, the extreme edge computing device 284 or edge computing device 292, among other processing devices, using the captured information provided by the optical sensors 126 to identify the items placed on the checkout plane 122, the processing device 172 can also generate a checkout list comprising the identified items for a display on the display 240. However, in instances in which one or more items are not recognized by, or identifiable to, the processing device 172, including via the machine learning and visual recognition systems discussed herein, one or more of the optical sensors 126 can be used to scan the unidentified item(s). For example, the cashier can hold the UPC barcode or QR code of an item, or other identifying marking of the item, up close to one of the optical sensors 126 of the POS station 100, such that the item takes up a more substantial fraction of the field of view of the optical sensor 126. Such an action can prompt the POS station 100 to perform an identification that is based on the UPC barcode or other identifying marking. Such identifying functionality may, for example, employ optical character recognition (OCR) to read a label of the item. Alternatively, the cashier can scan the one or more unidentified items using a UPC barcode reader or a QR code reader. Alternatively, the cashier can utilize an I/O device 242, such as, for example, a touch screen or keyboard, to manually enter an identifying marking, such as number, for the item into the frontend or other system coupled to the POS station 100.

According to certain embodiments, certain items can be placed on the POS station 100 but outside of the checkout plane 122. For example, in certain instances, a buyer can place one or more items on at least a portion of one or more border walls 128a-d rather than within the checkout plane 122. Similarly, the buyer can place other objects that are not being purchased on the border walls 128a-d, including, for example, keys, a hand, wallet, purse, or other items. According to certain embodiments, the sensor system 288 can include one or more position sensors 296 that can detect at least a partial presence of such items or objects on the POS station 100, but that are at least partially, if not entirely, positioned outside of the checkout plane 122. A variety of different types of sensors can be utilized as the position sensor 296, including, but not limited to, proximity sensors, among others. In such instances, the cashier and/or buyer can be altered to the presence of the detected object outside of the checkout plane 122, including, for example, via the processing device 172 generating one or more signals to selectively activate the cue device 166, including, for example, to facilitate generation of a visual cue using the illumination device 168, an audible alert communicated via the speaker 170, and/or an alert displayed on the display 240 of an I/O device 242. Additionally, the processing device 172 can be configured to at least temporarily suspend the checkout process until, for example, the item has been moved to be fully within the checkout plane 122, the detected object has been removed from the border wall 128a-d, and/or an override command has been received by the processing device 172 from an I/O device 242.

FIGS. 22-25 illustrate another example of a POS station 100' in which first and second optical sensors 126a, 126b are each vertically suspended above a base portion 102' by a single support tower 106'. Further, the illustrated embodiment includes a plurality of support towers 106', and, more specifically, two support towers 106' that each are coupled to a pair of optical sensors 126a, 126b. According to certain embodiments, the optical sensors 126a, 126b can be secured to an associated support tower 106' in a manner that maintains the optical sensors 126a, 126b at fixed positions and orientations. Alternatively, according to other embodiments, the optical sensors 126a, 126b can be mounted to the support towers 106' via swivels, hinges, or ball-and-socket joints, for example, to provide adjustable orientations. Further, similar to other embodiments discussed herein, the support towers 106' are configured to support the optical sensors 126a, 126b at a vertical height such that the items placed on the checkout plane 122 are within a field of view of at least one optical sensor 126a, 126b from either or both support towers 106'. Moreover, the optical sensors 126 can be positioned such that the focal point of the optical sensors 126 can be at locations similar to those discussed above with respect to the POS station 100 shown in at least FIG. 1.

In the illustrated embodiment, the support tower 106' comprises a riser portion 202" and an arm portion 298. The riser portion 202', which is configured to ascend in the vertical direction from the side support 104', and thus elevate the optical sensors 126a, 126b coupled thereto, can comprise a stabilizing body or element 300 and a support fin 302. The stabilizing element 300 and the support fin 302 can be configured to assist in supporting or stabilizing the arm portion 298 and/or the optical sensors 126a, 126b coupled to the arm portion 298. Moreover, the stabilizing element 300 and the support fin 302 can be configured to provide additional rigidity to the arm portion 298, and thus to the optical sensors 126a, 126b coupled to the arm portion 298, regardless of whether the optical sensors 126a, 126b are, or are not, secured in a generally static orientation relative to at least the arm portion 298.

While the stabilizing element 300 can be angularly oriented relative to the support fin 302 in a variety of directions, in the illustrated embodiment the stabilizing element 300 can horizontally extend along a plane that is perpendicular to, and can intersect a corresponding plane along which the support fin 302 extends. Thus, referencing FIG. 25, the stabilizing element 300 can linearly extend in the first direction ("$d_1$") away from a union or joint 304 joining the stabilizing element 300 and the support fin 302, or vice versa, while the support fin 302 can linearly extend in the second direction ("$d_2$") away from the union or joint 304, the second direction being generally perpendicular to the first direction. The stabilizing element 300 and support fin 302 can each also vertically extend from a base 306, 308 at a first end 310, 312 of the associated stabilizing element 300 and support fin 302, respectively, and to a top portion 314, 316 at an opposing second end 318, 320 of the corresponding stabilizing element 300 or support fin 302, respectively. In the illustrated example, at least the base 306 of the stabilizing element 300 is affixed to the base portion 102' of the POS station 100'. The base 306 and the top portion 314, as well as an opposing inner wall 322 and an outer wall 324 that extend between the base 306 and top portion 314 can generally define the stabilizing element 300. Similarly, the base 308 and the top portion 316, as well as an opposing inner wall 326 and an outer wall 328 that extend between the base 308 and top portion 316 can generally define the support fin 302. According to certain embodiments, the outer wall 328 of support fin 302 can abut, or by adjoined to, the stabilizing element 300 at a location between the inner wall 322 and outer wall 324 of the stabilizing element 300.

In the illustrated embodiment, the base 306 of the stabilizing element 300 can have a linear length between the opposing inner and outer walls 322, 324 of the stabilizing element 300 that is larger than a corresponding linear length of the base 308 of the support fin 302 between the associated inner and outer walls 326, 328. Conversely, the top portion 314 of the stabilizing element 300 can have a linear length between the opposing inner and outer walls 322, 324 of the stabilizing element 300 that is smaller than a corresponding linear length of the top portion 316 of the support fin 302 between the associated inner and outer walls 326, 328. Thus, the linear width of the stabilizing element 300 between inner and outer walls 322, 324 can decrease as stabilizing element 300 extends from the base portion 102' to the top portion 314, while the linear width of the support fin 302 between inner and outer walls 326, 328 can increase as support fin 302 extends from the base portion 102' to the top portion 316 of the support fin 302. Additionally, the outer walls 324, 328 of the stabilizing element 300 and the support fin 302 can be generally parallel to each other. Further, the inner wall 322 of the stabilizing element 300 can be inwardly tapered or sloped from the base 306 to the top portion 314 of the stabilizing element 300, while the inner wall 326 of the support fin 302 can have a generally inwardly curved or rounded configuration.

Figure 23:
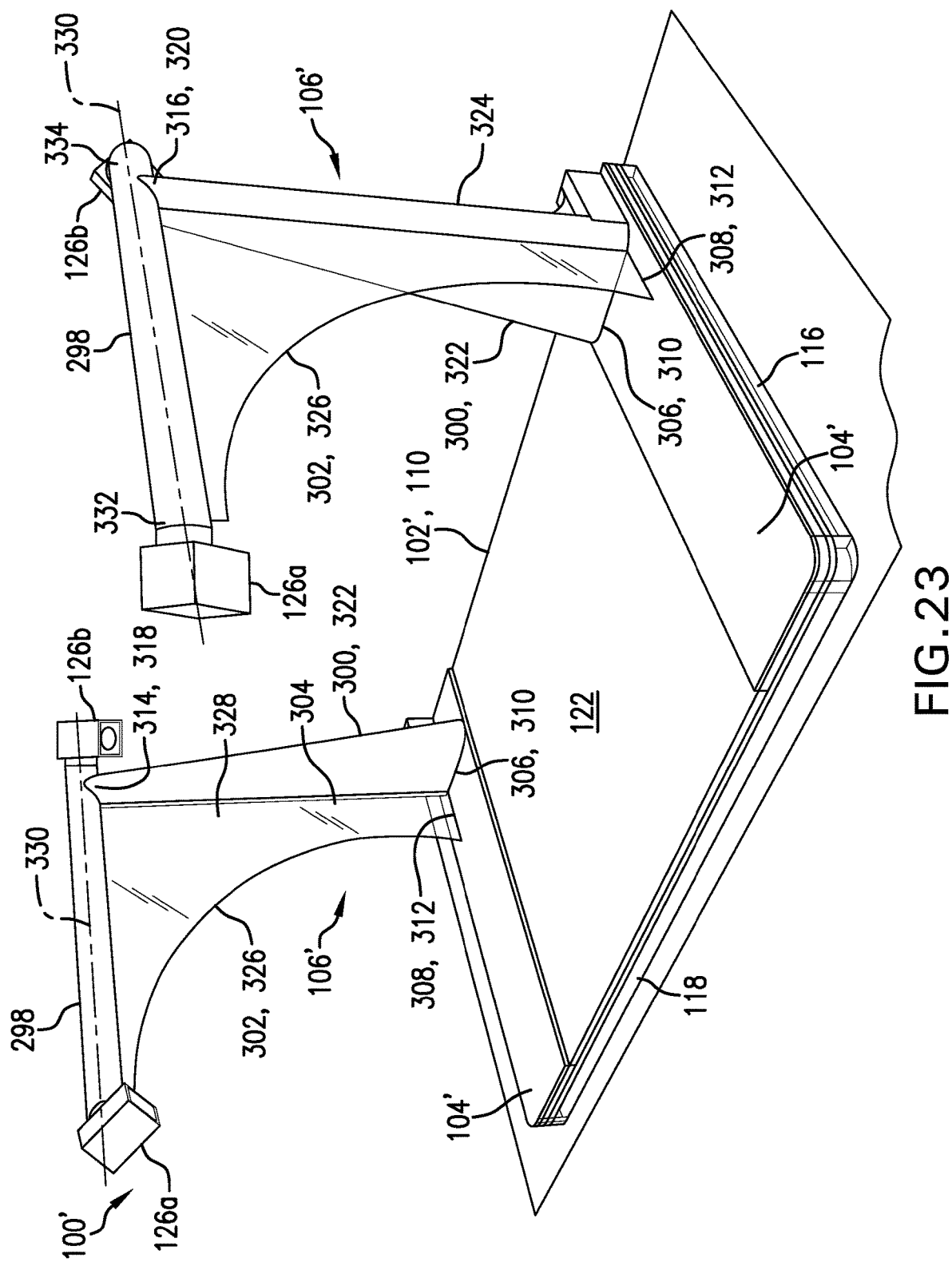
FIGS. 23, 24, and 25 illustrate a front side perspective view, a side view, and a top view, respectively, of the point-of-sale station shown in FIG. 22.
Figure 24:
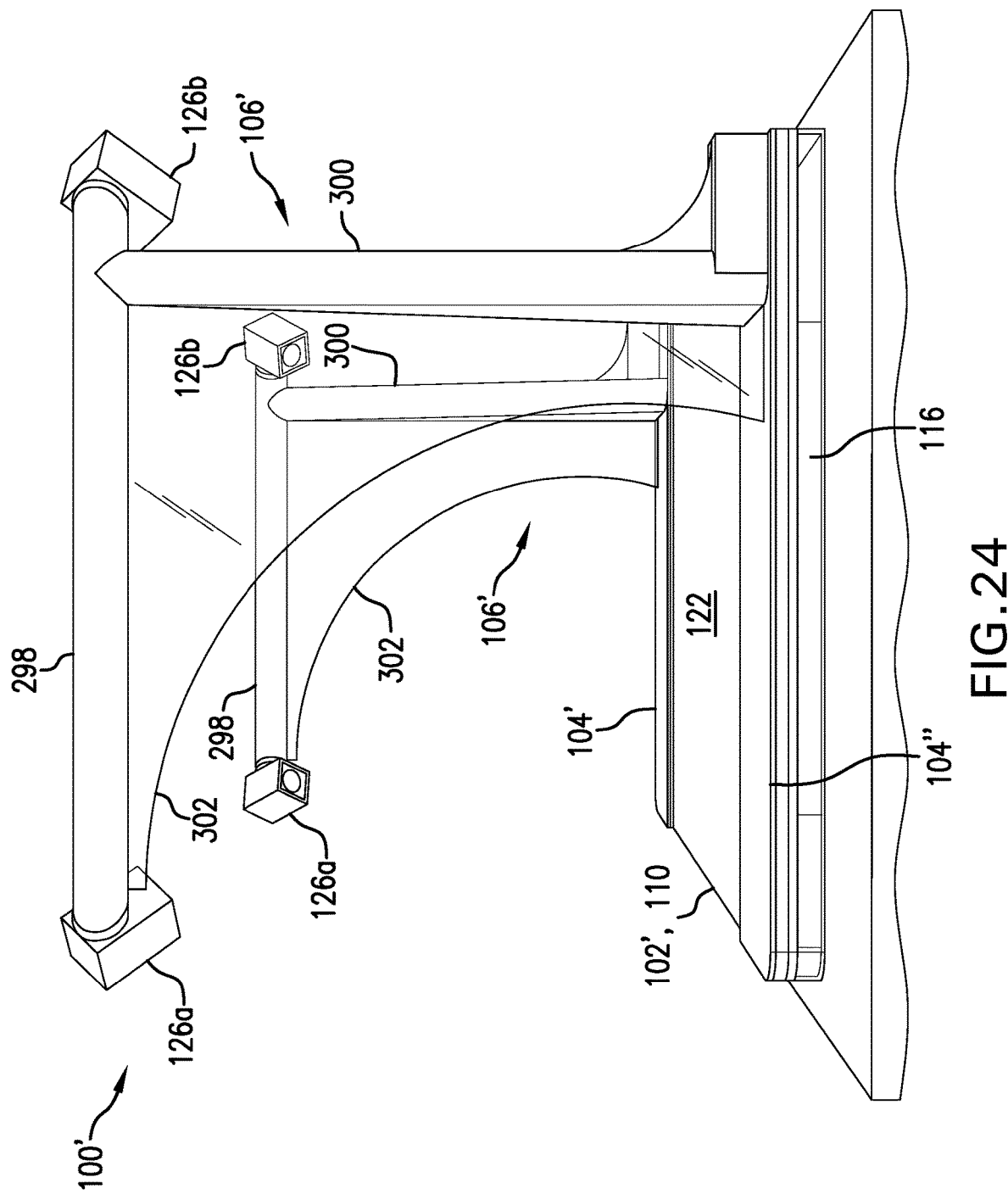
Figure 25:
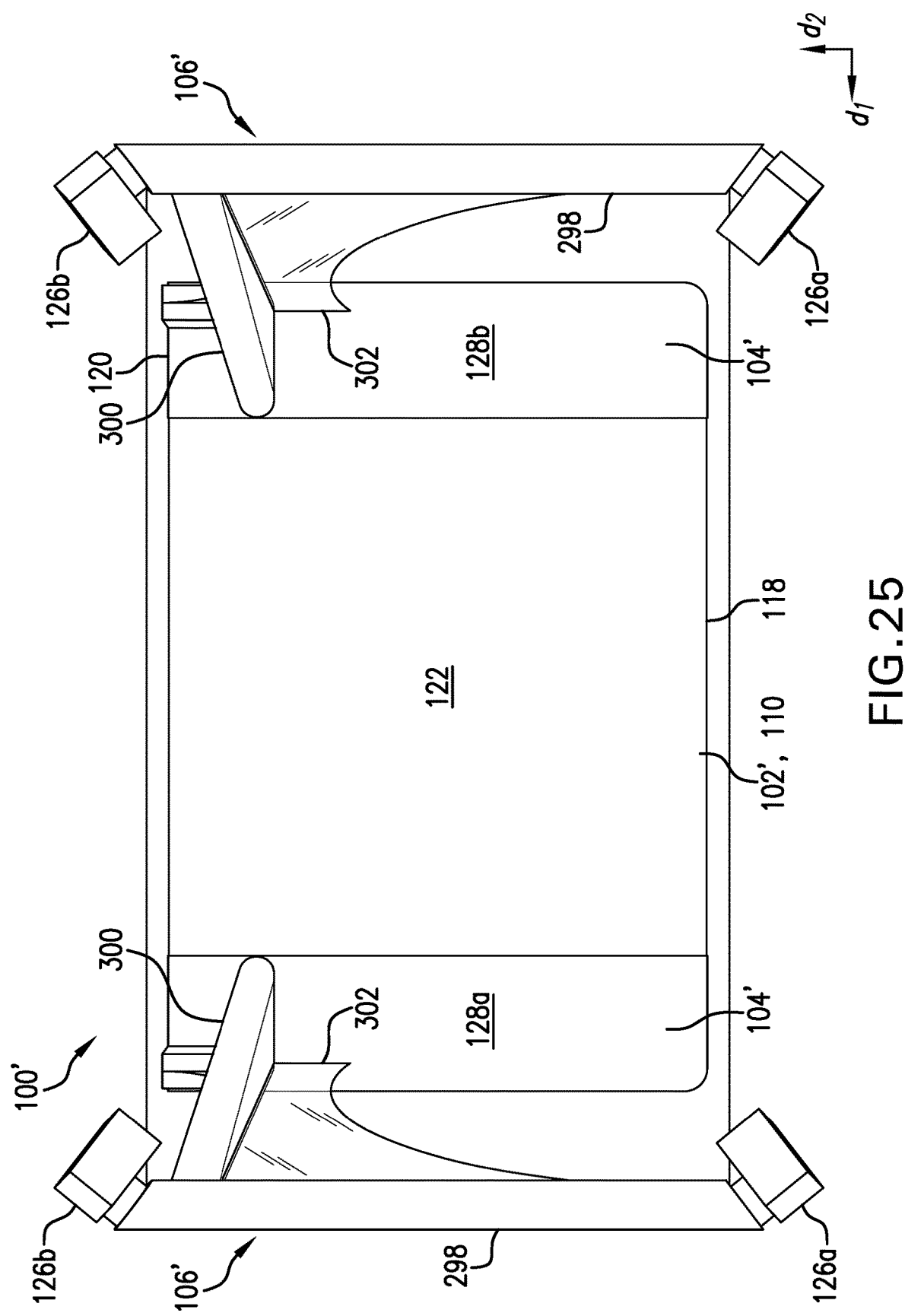

As seen in FIG. 23, the arm portion 298 can linearly extend along a central longitudinal axis 330 in direction that is generally parallel to the checkout plane 122. For example, in the illustrated example, the arm portion 298 linearly extends in the second direction ("$d_2$" in FIG. 25), but can also instead be configured to extend in the first direction ("$d_1$" in FIG. 25). According to the illustrated embodiment, the arm portion 298 has a generally tubular or cylindrical configuration, and extends from a first end 332 to a second end 334 of the arm portion 298. The first end 332 can be coupled to the first optical sensor 126a, and the second end 334 can be coupled to the second optical sensor 126b. Additionally, compared to the first end 332, the second end 334 of the arm portion 298 can be in closer linear proximity to at least the top portion 314 of the stabilizing element 300. Thus, the stabilizing element 300 can be coupled to the arm portion 298 at a location that, relative to the direction at which the central longitudinal axis 330 extends along the arm portion 298, is offset from a central location of the arm portion 298. Further, the top portion 316 of the support fin 302 can extend, in a direction generally parallel to the central longitudinal axis 330, from a location at which the stabilizing element 300 is generally coupled to the arm portion 298 to about the first end 332 of the arm portion 298. Moreover, the linear distance at which the top portion 316 of the support fin 302 is offset, if at all, from the first end 332 of the arm portion 298 can be smaller than the linear distance between the location at which the stabilizing element 300 is generally coupled to the arm portion 298 and the second end 334 of the arm portion 298. Further, while the stabilizing element 300 and support fin 302 can be constructed from a variety of materials, according to certain embodiments, the support fin 302 can be generally transparent and the stabilizing element 300 can be opaque.

Similar to the base portion 102 shown in at least FIG. 1, the base portion 102' shown in FIGS. 20 and 22-25 also includes a checkout plane 122. However, as seen in at least FIG. 25, the checkout plane 122 shown in at least FIGS. 20 and 22 has a boundary 124 along the front and rear sides 336, 338 of the checkout plane 122 that is positioned adjacent to, or vertically aligned with, front side 118 and the rear side 120, respectively, of the base portion 102'. Thus, the embodiments shown in at least FIGS. 20 and 22 do not include adjacent front and rear boarder walls 128c, 128d, as are seen with respect to the POS station 100 shown in at least FIG. 1. The boundary 124 of the checkout plane 122 shown in at least FIGS. 20 and 22 further includes first and second sides 340, 342 that define at least a portion of the boundary 124 of the checkout plane 122 and that are separated, or offset from, adjacent first and second walls 114, 116 of the base portion 102', respectively, by first and second border walls 128a, 128b. In the illustrated embodiments shown in at least FIG. 22, each of the first and second border walls 128a, 128b can, at least in part, be provided by side supports 104 for the support towers 106'. Additionally, in the illustrated embodiment shown in at least FIG. 22, the checkout plane 122 is vertically offset, including either raised or recessed relative to the first and second side border walls 128a, 128b and/or the side supports 104, which can further assist in a buyer identifying or recognizing the checkout plane 122.

Figure 26:
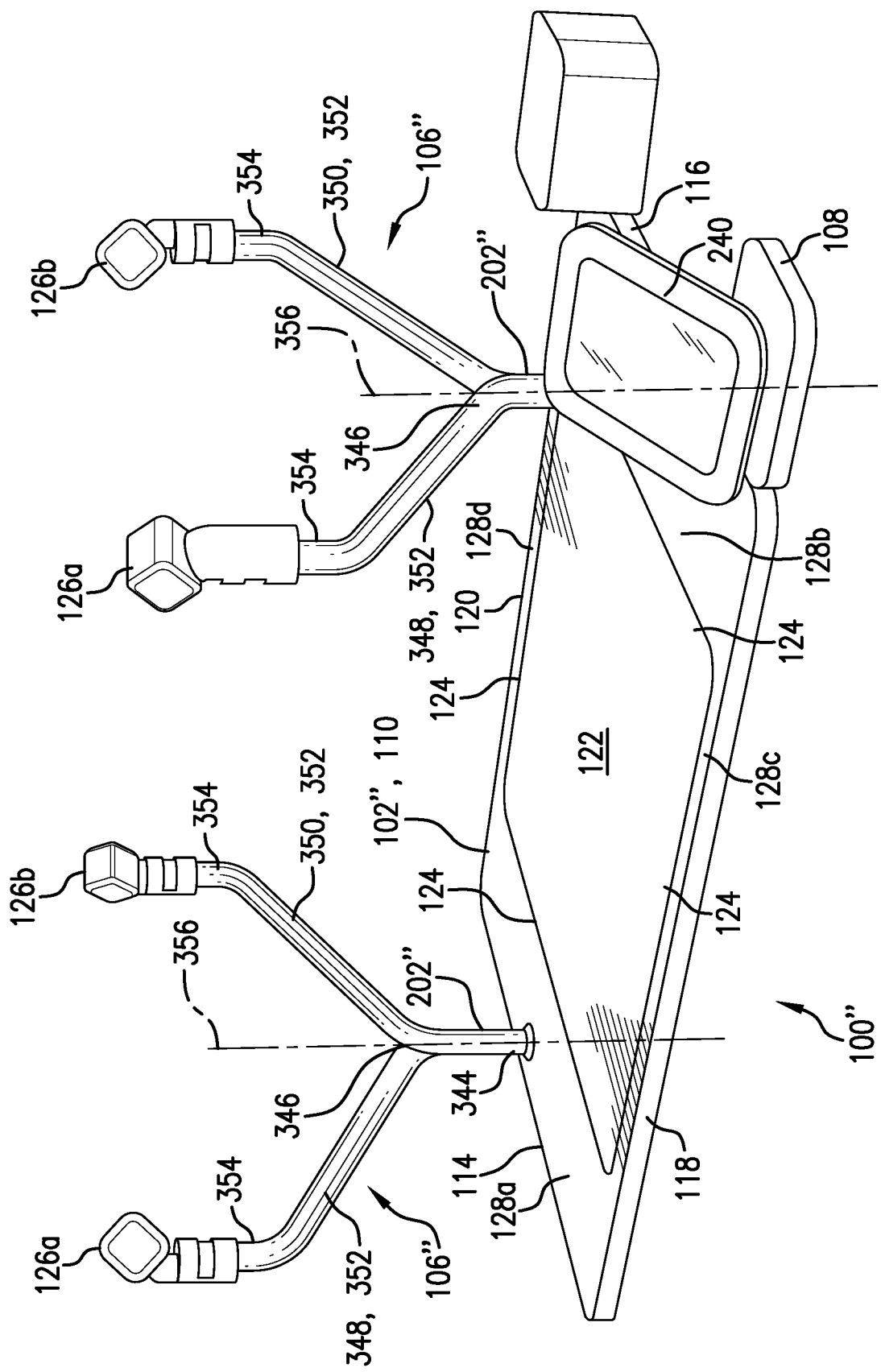
FIG. 26 illustrates perspective view of another exemplary point-of-sale station for an assisted checkout system.

FIG. 26 illustrates perspective view of another exemplary POS station 100" for an assisted checkout system 200. In this embodiment, the boundary 124, and thus the checkout plane 122, of the base portion 102" of the POS station 100" is generally similar to that discussed above with respect to FIG. 1. Thus, as seen in FIG. 26, the boundary 124 can generally be offset from the opposing front and rear sides 118, 120 of the base portion 102", as well as from the opposing first and second sides 114, 116 of the base portion 102". Such a configuration can accommodate a plurality of boundary walls 128a-d being located about the base portion 102", and around the boundary 124 and/or checkout plane 122. Additionally, the POS station 100" can include a single I/O device 242, such as, for example, a display 240 for the front end of the assisted checkout system 200, as discussed above, and an associated user interface 108 outwardly extending from one of the first and second sides 114, 116 of the base portion 102". Additionally, FIG. 26 further illustrates the inclusion of a cue device 166, such as, for example, a speaker 170, that is coupled to, and outwardly extends from, one of the first and second sides 114, 116 of the base portion 102".

The POS station 100" further includes a pair of support towers 106", each support tower 106" being configured to support a pair of optical sensors 126a, 126b. Similar to other embodiments, discussed herein, the support towers 106" are configured to support the optical sensors 126a, 126b at a vertical height such that the items placed on the checkout plane 122 are within a field of view of at least one optical sensor 126a, 126b from either or both support towers 106". Moreover, the optical sensors 126a, 126b can be positioned such that the focal point of the optical sensors 126 can be at locations similar to those discussed above with respect to the POS station 100 shown in at least FIG. 1.

In the embodiment shown in FIG. 26, each support tower 106" can include a vertically extending riser portion 202" that extends from a first end 344 to a second end 346 of the riser portion 202", the first end 344 being coupled to the base portion 102". In the illustrated embodiment, the first end 344 is coupled to the base portion 102" at a location between the front and rear sides 118, 120 of the base portion 102", including, for example, at a mid point between the front and rear sides 118, 120. Additionally, as seen in FIG. 26, the first end 344 of one support tower 106" can be generally adjacent to the first side 114 of the base portion 102" while the first end 344 of the other support tower 106" can be generally adjacent to the second side 116 of the base portion 102". Thus, the support towers 106" can be positioned on opposite sides of the base portion 102" and/or checkout plane 122.

Both support towers 106" can further each include a first branch arm 348 and a second branch arm 350 that extend from the second end 346 of the riser portion 202". The first and second branch arms 348, 350 can share a plane that extends in a direction from the front side 118 to the rear side 120 of the base portion 102". Each branch arm 348, 350 can have a first segment 352 and a second segment 354, the first segment 352 extending from second end 346 of the riser portion 202", and the second segment 354 extending from the first segment 352 to an associated optical sensor 126a, 126b. The first segment 352 can extend both upwardly and laterally relative to the second end 346 of the riser portion 202". Further, the first segment 352 can laterally extend relative to a central longitudinal axis 356 of the riser portion 202", toward the front side 118 of the base portion 102", while the first segment 352 of the second branch arm 350 can laterally extend relative to the central longitudinal axis 356 in an opposite, or diverging, direction toward the rear side 120 of the base portion 102". Thus, as seen in at least FIG. 26, the first segments 352 of the first and second branch arms 348, 350 can be arranged to form a "v" shape. However, the first segments 352 of the first and second branch arms 348, 350 can be arranged to form a variety of other shapes, including, but not limited to a "U" shape, among other shapes. Further the second segment 354 of the first branch arm 348 can be parallel to the second segment 354 of the second branch arm 350.

An optical sensor 126a, 126b can be coupled to each of the second segments 354 of the first and second branch arms 348, 350. According to certain embodiments, one or more of the optical sensors 126a, 126b can be secured to an associated second segment 354 in a manner that maintains that optical sensor 126a, 126b at fixed position and orientation. Alternatively, or additionally, one or more optical sensors 126a, 126b can be mounted to an associated second segment 354 via swivels, hinges, or ball-and-socket joints, for example, to provide adjustable orientations for that optical sensor 126a, 126b.

Figure 27:
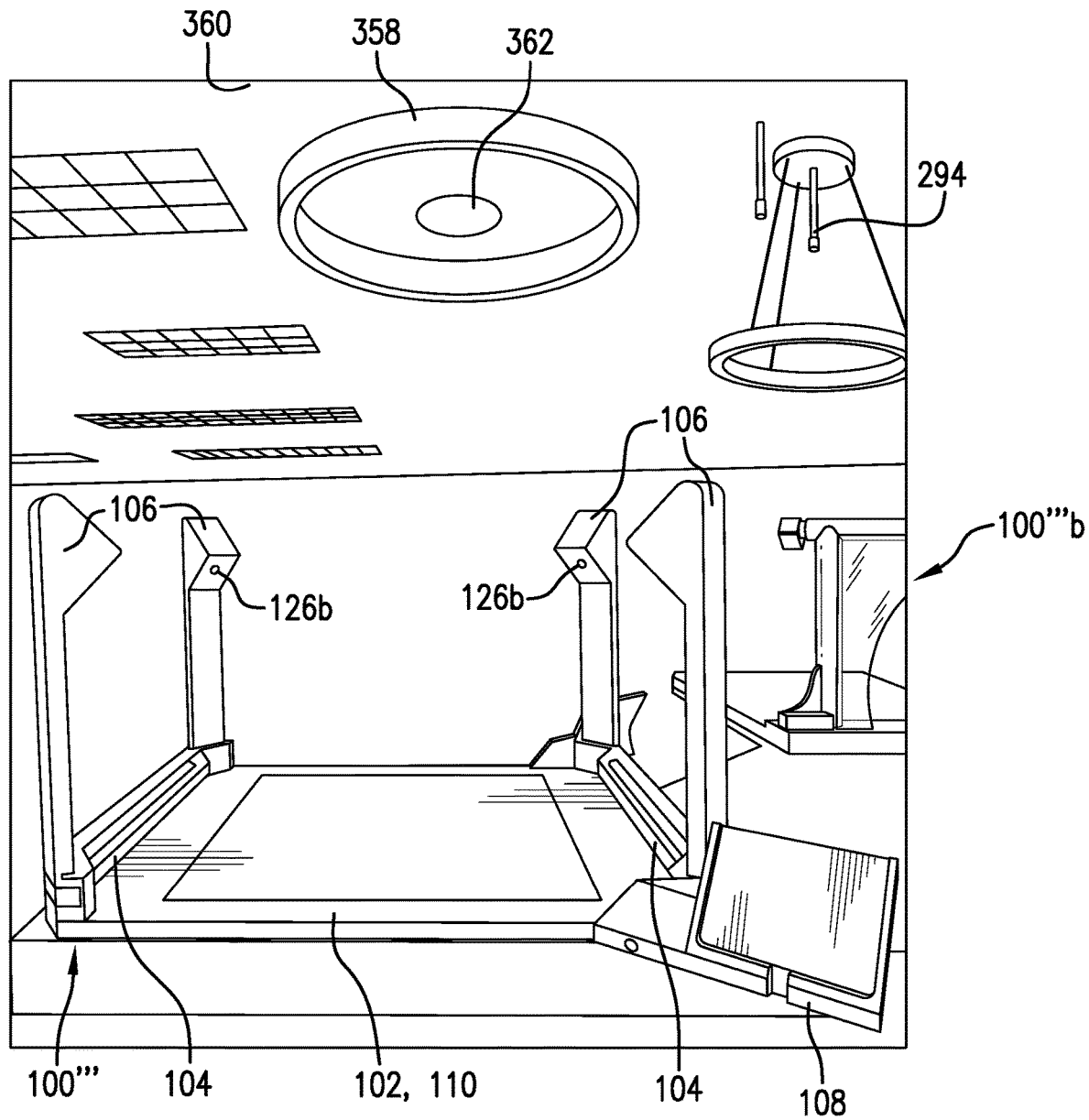
FIG. 27 illustrates perspective view of another exemplary point-of-sale station for an assisted checkout system.

FIG. 27 illustrates perspective view of another exemplary POS station 100''' for an assisted checkout system 200. The POS station 100''' can be similar to the POS station 100 shown and discussed above with respect to FIG. 1, but can further include an overhead ring lighting fixture 358. The overhead lighting fixture 358 can be provided to light the scene and provide improved object detection, in part by adding greater uniformity of lighting conditions between different instances of POS stations 100. For example, data from a first POS station 100'''' used to train ML models used at a second POS station 100'''b is more reliably applicable to the conditions at the first POS station 100''' when the checkout scene of the first and second POS stations 100''', 100'''b are similarly lit.

FIG. 27 also illustrates an overhead optical sensor 294 in the form of a fifth camera over another assisted checkout device. The overhead optical sensor 294 is not placed in the ceiling 360, but instead is suspended substantially below the ceiling 360. In examples using an overhead optical sensor 294, the optical sensors 126 mounted to the POS station 100''' and the overhead optical sensor 294 can work together. For example, the overhead optical sensor 294 can be used to accurately predict the number of items placed on the checkout plane 122. However, in certain instances, if multiple of items are placed at once on the checkout plane 122, the optical sensors 126 mounted to the POS station 100'''' may not have a clear view of all of those items. Thus, information provided by the overhead optical sensor 294, can, when compared with the number of items identified using captured information obtained using the optical sensors 126 mounted to the POS station 100''', be used to confirm whether each item has, or has not been identified, and thus whether checkout is not yet complete. The overhead optical sensor 294 can also assist with cashier attendance notification. From the overhead view, it is possible to more accurately determine when a buyer is interacting with the checkout plane 122, including when the buyer has finished placing items on the checkout plane 122 and is ready to be checked out. An assessment that the buyer has finished placing items on the checkout plane 122 can trigger a cashier attendance notification that calls the cashier to confirm checkout. According to certain embodiments, the overhead optical sensor 294 can also be used to read receipts in examples in which a customer may want to pay for prepared food identified by a printed receipt, which can be placed on the checkout plane 122.

Alternatively, in other embodiments, an overhead mirror 362 can be provided instead of an overhead optical sensor 294. According to such an embodiment, rather than being oriented in the general direction of the checkout plane 122, at least one of the optical sensors 126 that are mounted to the POS station 100''' can be oriented to detect an image being reflected by the mirror 362. In such an example, the optical sensor 126 can, via the image reflected by the mirror 362, be able to provide a top-down view of the scene at, or around, the checkout plane 122 with lower cost and easier maintenance. Further, according to certain embodiments, the mirror 362 can be integrated with the lighting fixture 358.

According to certain embodiments, a weight sensor 364 (FIG. 21), including, for example, a weight sensing mat or scale can be provided in the base portion 102 of the POS station 100'''. The weight sensor 364 can provide supplemental pressure data than in some instances that can obviate the need for an overhead optical sensor 294. The pressure data can also provide an approximation of the respective locations of items are on the checkout plane. A weight sensor 364 in the form of a scale can also provide an overall weight of the items on the checkout plane 122, with such weight data being used to assess the accuracy of the checkout list derived using the captured information from the optical sensors 126, and the associated above-discussed identification of items via at least machine vision or optical recognition.

What have been described above are examples of the inventive technology. It is, of course, not possible to describe every conceivable combination of components or methodologies for purposes of describing the technology, but one of ordinary skill in the art will recognize that many further combinations and permutations of the technology are possible. Accordingly, the inventive technology is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A point-of-sale station for selling one or more items, the point-of-sale station comprising:
   a base portion having a checkout plane configured for placement of the one or more items;
   a plurality of optical sensors; and
   a plurality of support towers, each support tower of the plurality of support towers comprising a riser portion and an arm portion, the riser portion having a stabilizing body and a support fin, the support fin adjoined to the stabilizing body,
   a first end of the stabilizing body coupled to the base portion and a second end of the stabilizing body coupled to the arm portion, an inner wall and an outer wall of the stabilizing body extend between the first and second ends of the stabilizing body in a first direction that is aligned with a first adjacent side of the base portion,
   a first end of the support fin coupled to the base portion and a second end of the support fin coupled to the arm portion, the support fin extending between an inner wall and an outer wall of the support fin in a second direction that is aligned with an adjacent second edge of the base portion, the first edge being non-parallel to the second edge,
   the arm portion extending in the second direction, a first optical sensor of the plurality of optical sensors coupled to, and at least outwardly offset from, a first end of the arm portion and a second optical sensor of the plurality of optical sensors coupled to, and at least outwardly offset from, a second end of the arm portion, and
   each support tower being configured to position the first and second optical sensors at a vertical height that is higher than the checkout plane on which the one or more items are to be placed when being purchased, the plurality of optical sensors configured to capture information from which one or more still images can be extracted for a recognition of the one or more items placed on the checkout plane, and wherein a focal point of the first and second optical sensors is vertically aligned with, and offset from, a geometric center of the checkout plane.

2. The point-of-sale station of claim 1, wherein the focal point of the first optical sensor is vertically offset from the focal point of the second optical sensor.

3. The point-of-sale station of claim 1, wherein each support tower of the plurality of support towers is coupled to a side support that is attached to the base portion and extends along at least an edge of the base portion, the side support defining at least a portion of a boundary of the checkout plane.

4. The point-of-sale station of claim 3, wherein at least the portion of the boundary defined by the side support is offset from one or more sides of the base portion.

5. The point-of-sale station of claim 1, wherein the inner and outer walls of the stabilizing body are separated at the first end of the stabilizing body by a first distance, and the inner and outer walls of the stabilizing body are separated at the second end of the stabilizing body by a second distance, the second distance being smaller than the first distance.

6. The point-of-sale station of claim 5, wherein the inner and outer walls of the support fin are separated at the first end of the support fin by a third distance, and the inner and outer walls of the support fin are separated at the second end of the support fin by a fourth distance, the fourth distance being greater than the third distance.

7. The point-of-sale station of claim 3, wherein the side support further includes a cue device configured to emit an output signal indicative of a status of an operation of the point-of-sale station.

8. The point-of-sale station of claim 7, wherein the cue device comprises an illumination device, the illumination device configured to selectively illuminated in at least one of a plurality of colors, each color of the plurality of colors corresponding a different status of the operation of the point-of-sale station.

9. The point-of-sale station of claim 7, wherein the cue device comprises a speaker, the speaker configured to selectively emit one of a plurality of tones, each tone of the plurality of tones corresponding a different status of the operation of the point-of-sale station.

10. The point-of-sale station of claim 1, further including a secondary optical sensor oriented to detect an image of the one or more items from a mirror positioned above the checkout plane.

11. A point-of-sale station for selling one or more items, the point-of-sale station comprising:
   a base portion that defines at least a portion of a checkout plane, the checkout plane configured for placement of the one or more items;
   a plurality of support towers coupled to the base portion, the plurality of support towers including a riser portion and an arm portion, the riser portion having a stabilizing body and a support fin that both extend at least upwardly vertically relative to an upper surface of the base portion to the arm portion, the support fin extending in a direction that intersects the stabilizing body at a union between the support fin and the stabilizing body, the support arm extending along at least a top portion of the support fin;
   a plurality of cameras comprising a first camera and a second camera, the first and second cameras coupled to, and are at least outwardly offset from, opposing ends of the support arm, each of the first and second cameras having a focal point that is vertically aligned and offset from a geometric center of the checkout plane, the plurality of cameras configured to capture information that can provide one or more still image frames representing the one or more items on the checkout plane.

12. The point-of-sale station of claim 11, wherein the support fin extends between a first end and a second end, the second end being positioned at the top portion, and wherein the support fin has a first width between an inner wall and an outer wall of the support fin and a second width between the inner wall and the outer wall at the second end, the second width being larger than the first width.

13. The point-of-sale station of claim 11, further comprising a cue device at least partially housed within a cavity of the point-of-sale station, the cue device configured to emit an output signal indicative of one or more statuses of a transaction involving the point-of-sale station.

14. The point-of-sale station of claim 13, wherein the cue device is a light emitting diode.

15. The point-of-sale station of claim 13, wherein the support fin is constructed of a transparent material.

16. The point-of-sale station of claim 11, further including a first user interface stand coupled to the base portion, wherein the first user interface stand is configured to support a first display.

17. The point-of-sale station of claim 16, further including a second user interface stand coupled to the base portion and configured to support a second display, wherein the first user interface stand is configured to orient the first display relative to the checkout plane in a first direction and the second user interface stand is configured to orient the second display relative to the checkout plane in a second direction, the first direction being different than the second direction.

18. The point-of-sale station of claim 11, wherein the stabilizing body extends between a first end and a second end, the second end being adjoined to the arm portion, and wherein the stabilizing body has a first width between an inner wall and an outer wall of the stabilizing body and a second width between the inner wall and the outer wall at the second end, the first width being larger than the second width.

19. The point-of-sale station of claim 11, wherein the top portion extends in a direction that is generally parallel to a central longitudinal axis of the support fin.

20. The point-of-sale station of claim 11, further comprising a position sensor positioned to detect a presence of the one or more items at a location on the POS station that is outside of the checkout plane.

* * * * *